United States Patent [19]
Mori

[11] Patent Number: 5,803,250
[45] Date of Patent: Sep. 8, 1998

[54] CASE FOR DISK-TYPE RECORDING MEDIUM

[76] Inventor: Takanori Mori, 22-12 Igusa 3-chome, Suginami-ku, Tokyo-to, Japan

[21] Appl. No.: 895,607

[22] Filed: Jul. 16, 1997

Related U.S. Application Data

[63] Continuation of Ser. No. 399,833, Mar. 7, 1995, abandoned, which is a continuation-in-part of Ser. No. 155,080, Nov. 19, 1993, Pat. No. 5,522,500.

[51] Int. Cl.$^6$ .................................. B65D 85/30
[52] U.S. Cl. ..................... 206/308.1; 206/311; 229/75; 229/87.03
[58] Field of Search .................. 206/425, 309, 206/311, 312, 313, 308.1; 229/72, 75, 68.1, 87.03

[56] References Cited

U.S. PATENT DOCUMENTS

| | | | |
|---|---|---|---|
| 646,638 | 7/1900 | Cutler | 229/928 |
| 2,333,798 | 11/1943 | Kner | 206/313 |
| 3,063,618 | 11/1962 | Berkowitz | 229/68 |
| 3,063,619 | 11/1962 | Rhoten | 206/312 |
| 3,648,923 | 3/1972 | Young | 229/75 |
| 3,933,294 | 1/1976 | Meenan et al. | 229/1.5 R |
| 4,015,350 | 4/1977 | Zurrwelle | 40/105.5 |
| 4,453,631 | 6/1984 | Mark | 206/313 |
| 4,470,083 | 9/1984 | Doering et al. | 360/97 |
| 4,497,009 | 1/1985 | Oishi et al. | 360/133 |
| 4,536,812 | 8/1985 | Oishi et al. | 360/133 |
| 4,700,839 | 10/1987 | Fujii | 206/444 |
| 4,730,727 | 3/1988 | Petroff | 206/311 |
| 4,762,225 | 8/1988 | Henkel | 206/311 |
| 5,040,167 | 8/1991 | Tanaka et al. | 369/291 |
| 5,048,681 | 9/1991 | Henkel | 206/308.1 |
| 5,193,681 | 3/1993 | Lievsay | 206/311 |
| 5,268,808 | 12/1993 | Childers | 360/133 |
| 5,271,502 | 12/1993 | Chang | 206/425 |

FOREIGN PATENT DOCUMENTS

| | | |
|---|---|---|
| 520518 | 11/1938 | European Pat. Off. . |
| 686334 | 6/1950 | European Pat. Off. . |

*Primary Examiner*—Jacob K. Ackun
*Attorney, Agent, or Firm*—Testa, Hurwitz & Thibeault, LLP

[57] ABSTRACT

A case is described for receiving disk-type recording medium having a receiving chamber in which the disk-type recording medium is stored. The receiving chamber has a pair of walls adjacent each other and shaped to form a bellows. A stopper is formed from part of the receiving chamber, the lids or bottom, so that the disk-type recording medium is held in valleys of the bellows and by the stopper securely in a suspended condition. The case can be used as an inner case to be inserted in an outer case. The case can be made of paper.

10 Claims, 33 Drawing Sheets

CASE FOR DISK-TYPE RECORDING MEDIUM

CROSS-REFERENCE TO RELATED APPLICATIONS

This is a continuation of application(s) Ser. No. 08/399,833 filed on Mar. 7, 1995, and now abandoned, which is a CIP of Ser. No. 08/155,080, filed Nov. 19, 1993, now U.S. Pat. No. 5,522,500.

FIELD OF THE INVENTION

The present invention relates to a case for disk-type recording medium or media.

BACKGROUND

Disk-type recording medium such as compact disks (CD), video disks (LCD), micro compact disks (MCD) and floppy disks are stored mainly in plastic cases. Conventional plastic cases are expensive to manufacture because they are produced by a sophisticated molding machine which requires a costly mold assembly. In addition, plastic cases are difficult to dispose of because they produce toxic gases when they are incinerated and they do not readily decompose. Manufacturing a conventional disk case out of an environmentally friendly material such as paper, however, would result in greatly reduced protection to the disk.

It is therefore a principal object of the present invention to provide an environmentally friendly disk case which is inexpensive to manufacture and which securely holds disks.

SUMMARY OF THE INVENTION

The present invention provides a case for receiving disk-type recording medium. The case has a receiving chamber in which the disk-type recording medium is stored. The receiving chamber has a pair of walls adjacent each other, each having a shape of bellows so that the disk-type recording medium is held in valleys of the bellows in a suspended condition. The case may be formed from any flexible material. In a preferred embodiment, the case is formed from a cellulosic, degradable material such as paper.

The case for receiving disk-type recording medium according to the present invention can have an integral stopper which is formed by turning inward a portion of an upper surface or a bottom surface of the receiving chamber, so that a disk-type recording medium held by the bellows is abutted, at one edge, to the stopper and thus is held securely. Alternatively, the stopper may be a separate part inserted in the receiving chamber.

According to the present invention, the above-mentioned case can be used as an inner case which may be inserted in an outer case.

DETAILED DESCRIPTION OF PREFERRED EMBODIMENTS

Figure 1:
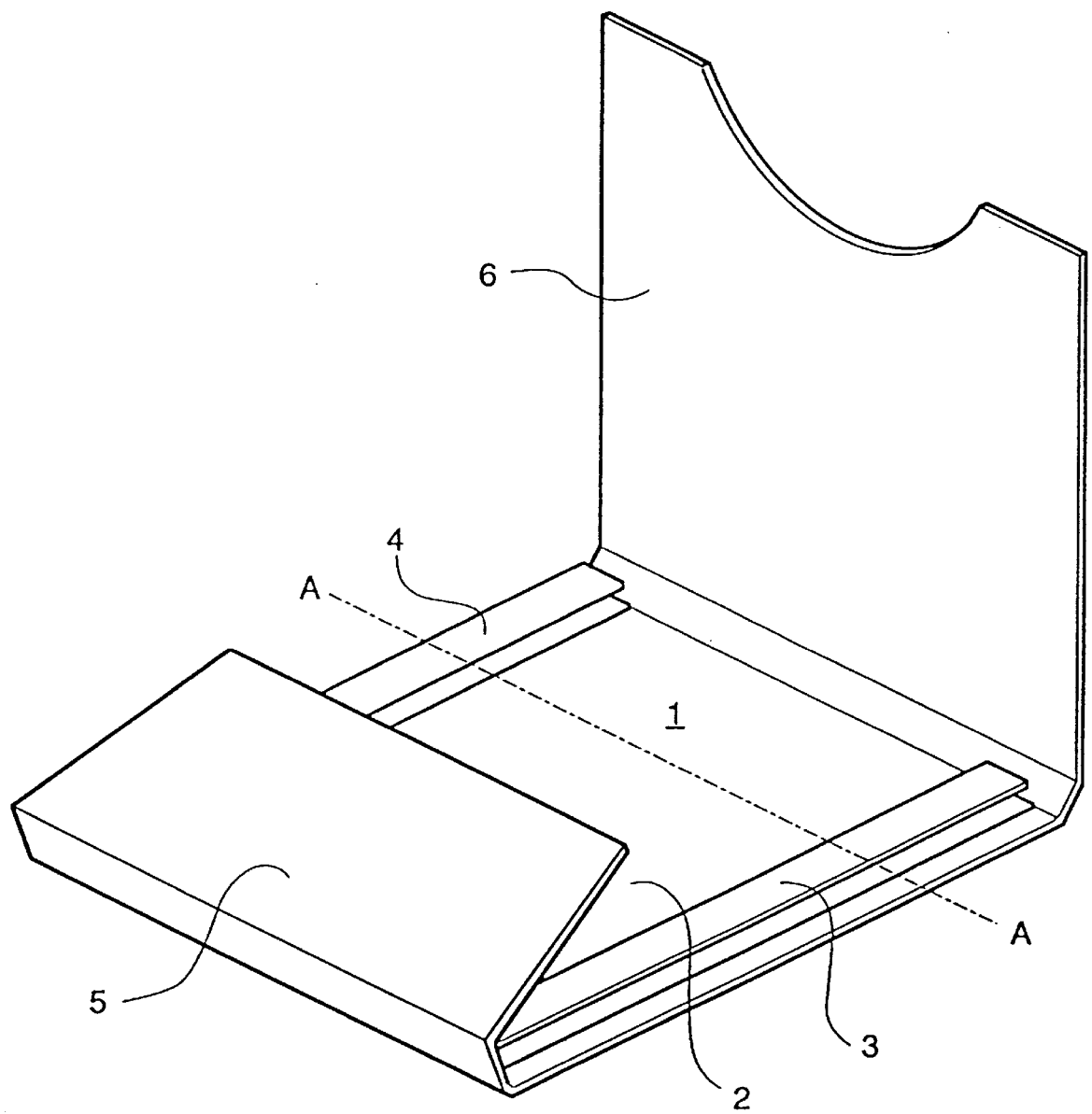
FIG. 1 illustrates a perspective view of one embodiment of a case for receiving a disk-type recording medium according to the present invention.

A case for receiving a disk-type recording medium according to the present invention preferably may be made from a punched sheet of paper which has a disk receiving surface for receiving a disk-type recording medium at the central portion of the sheet. A pair of wings extend at opposite sides of the disk receiving surface and a turn-up portion extends from one of the remaining sides. The wings are folded alternately to form a pair of bellows for supporting a disk-type recording medium. The turn-up portion also is folded to provide a lid which covers an upper part of the disk receiving chamber. The disk-type recording medium is clamped in valleys (edges) of the bellows in a floated condition and is supported stably by the elasticity of the bellows. Because the bellows resist external three dimensional forces, the recording medium is protected from damage and deformation.

An integral stopper may be formed by folding inwards a portion of an upper surface or a bottom surface of the receiving chamber. A variety of folding methods may be used to realize the stopper. For example, a portion of an upper surface or a bottom surface of the receiving chamber may be folded inwards, or two parts of a portion of the upper surface or the bottom surface may be folded inwards to form a stopper. Alternatively, a portion of the upper surface may be folded inwards and the resulting folded part may be further folded so that a secondly folded part contacts with the bottom surface. In all cases, the disk-type recording medium held by the bellows abuts to the stopper and is held stably. Alternatively, the stopper may be a separate part inserted into the receiving chamber.

In a variation, two turn-up portions may extend from the remaining opposite sides of the disk receiving surface. In this case, one of the turn-up portions provides an upper surface which covers the disk receiving chamber, while another tun-up portion is used as a lid which closes an inlet of the disk-type recording medium and covers the upper surface. The upper surface may be bonded to the bellows with adhesive. The lid ay have a tongue which is intended to be inserted into a slit formed on the upper urface so as to seal the disk receiving chamber. A stopper may be formed on the lid.

According to the present invention, the above-mentioned case may be used as an inner case which is then inserted in an outer case.

According to the present invention, the case for receiving disk-type recording medium may be made by a combination of an inner case and an outer case dimensioned for receiving the inner case therein. The inner case is prepared from a punched sheet having a central portion, side wings extending left and right from the central portion, and a turn-up portion extending longitudinally from the other side of the central portion. Each of the side wings is folded alternately for several times at a plurality of creases to form bellows while the turn-up portion is folded so as to cover the bellows. The number of folds of the bellows is not limited. A stopper is turned up into the inner case so that an edge of a recording medium inserted in the bellows is abutted to the stopper and hence is prevented from moving freely but is held stably.

The disk-type recording medium may be optical disks such as compact disks and video disks. The present invention is applicable preferably to compact disks (CD, CD-I, CD-V, etc.). The case according to the present invention may be made from a sheet of cellulosic material, preferably paper, including thick paper, cardboard, carton and laminated sheets. The cellulosic material may have printed indicia thereon.

In one embodiment, a leaflet describing the contents recorded on the recording medium or an advertisement is inserted in the bottom valley of the bellows and a disk-type recording medium is inserted in the next valley (edge) so that disk-type recording medium is clamped and held stably in a three-dimensionally suspended condition by elasticity of the bellows.

Several examples of the present invention are described with reference to the attached drawings.

EXAMPLE 1

FIG. 1 illustrates a disk case which is a first embodiment of the present invention. This disk case has a disk receiving chamber 1 for receiving a disk-type recording medium. The disk receiving chamber 1 has a rectangular disk receiving surface 2 whose opposite two sides (left and right sides in FIG. 1) are delimited by a pair of side supports 3, each having a shape of bellows and whose remaining opposite two sides (upper and lower sides in FIG. 1) are delimited by two lids 5, 6 each intended to cover the disk receiving chamber 1. All of these portions are made from a sheet of soft paper integrally.

Figure 2:
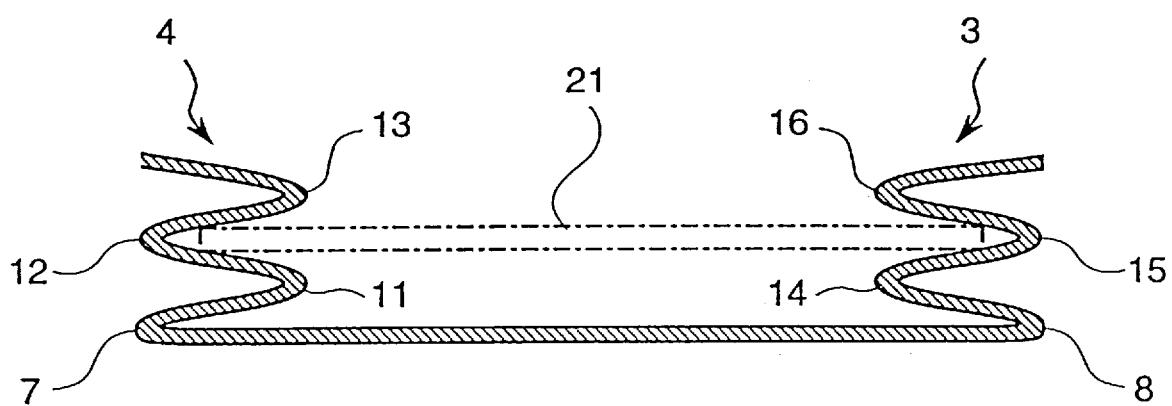
FIG. 2 is a cross section along A—A line in FIG. 1.

FIG. 2 is an illustration of a cross section along a line of A—A in FIG. 1. As is shown in FIG. 2, a disk-type recording medium 21 is inserted into opposite valleys of the disk supporting bellows 3,4 and is clamped or held between the opposite side surfaces of the ridges, so that the disk-type recording medium 21 is supported in a suspended condition except claming surfaces in the case.

In this embodiment, one of the lids 5 and 6 may be connected to the top surfaces of the disk supporting bellows 3,4 to form a box type case having an opening. In another variation, one of the lids 5 and 6 has a tongue (not shown) intended to be inserted into a slit (not shown) or the other engaging means formed on another lid.

Figure 3:
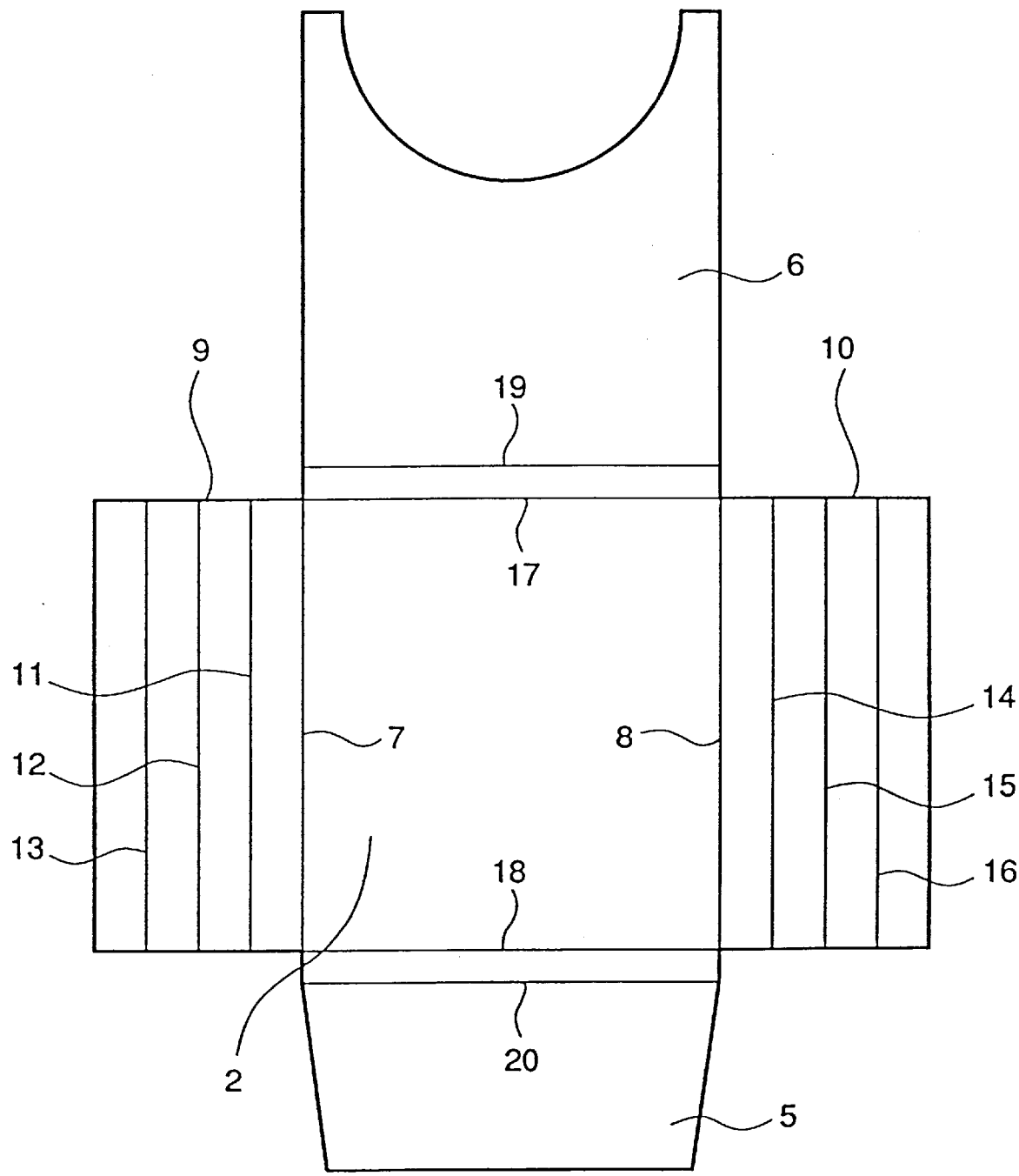
FIG. 3 is a development of the case shown in FIG. 1.

FIG. 3 shows a development of a sheet of soft paper from which the disk case of FIG. 1 is made. This sheet has a rectangular disk receiving surface 2 at the center, a pair of side wings 9, 10 extending from opposite sides 7, 8 of the disk receiving surface 2, and two lids 5, 6 extending from remaining opposite sides 17, 18 (upper and lower sides in FIG. 3) of the disk receiving surface 2. Each wing 9, 10 has three creases 11 to 13 and 14 to 16 which are folded alternately to form a disk supporting bellows 3, 4 consisting of valley 7, 8, ridge 11,14, valley 12, 15 and ridge 13, 16. Each lid 5, 6 has two creases 17, 18 and 19, 20 which are folded up towards the disk supporting surface 2 so that two lids 5 and 6 cover the disk receiving chamber 1.

The thickness of the disk case is determined by the positions of the creases 19, 20 which may be selected freely according to the height of the disk supporting bellows 3, 4 and the thickness of the disk case requested.

EXAMPLE 2

Figure 4:
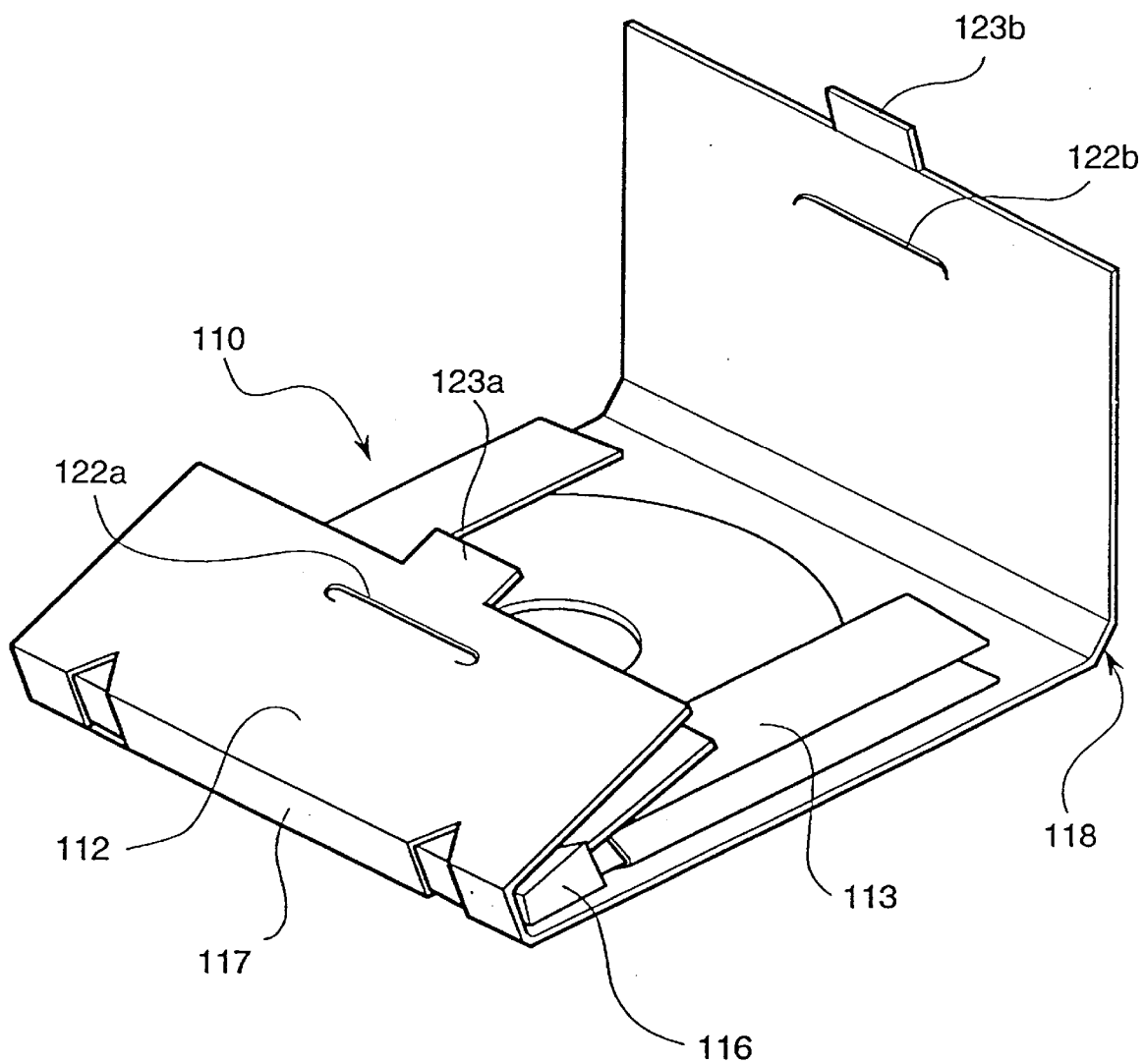
FIG. 4 is an illustrative perspective view of another embodiment of a case for receiving disk-type recording medium according to the present invention.
Figure 5:
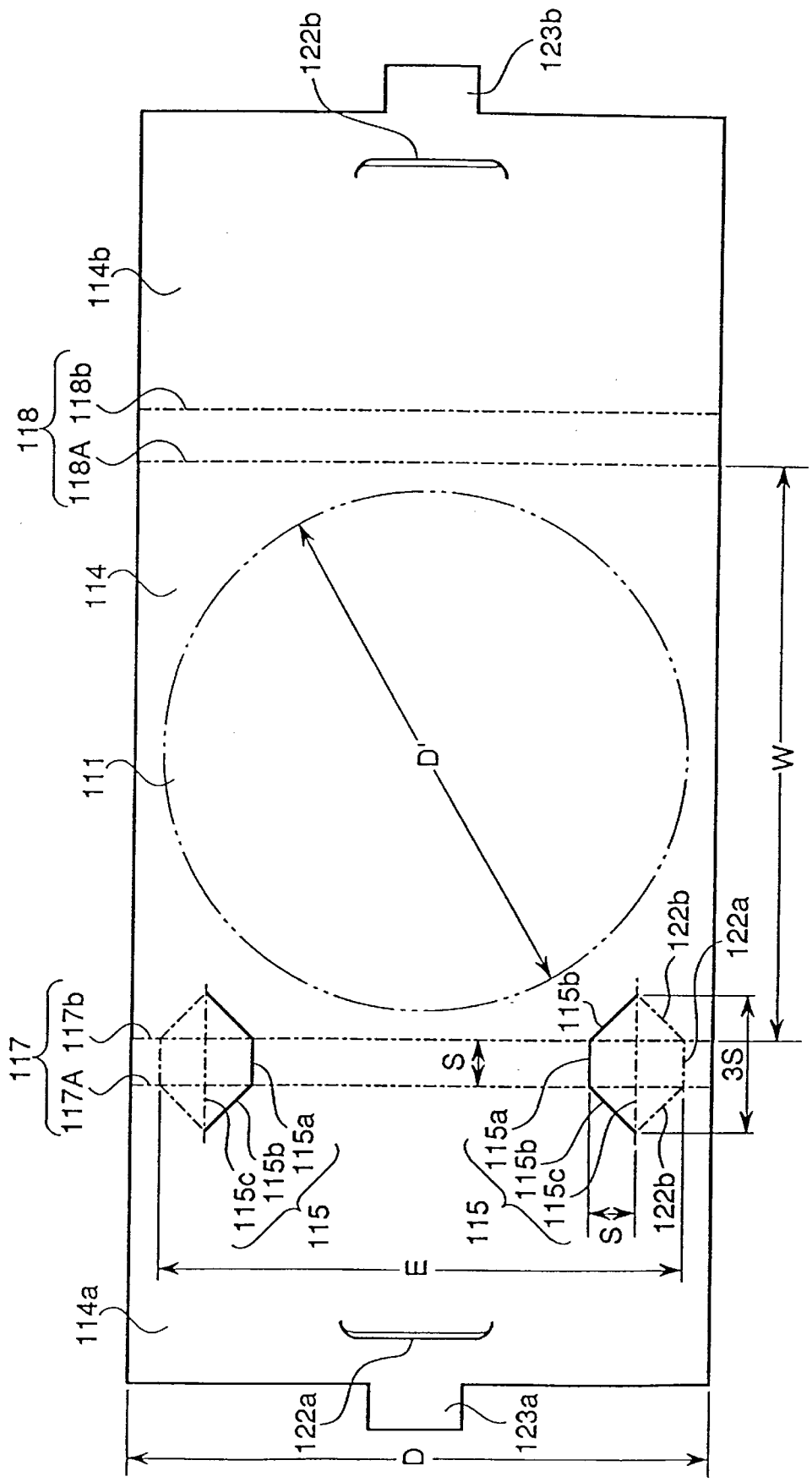
FIG. 5 is a development of the outer box used in the case shown in FIG. 4.
Figure 6:
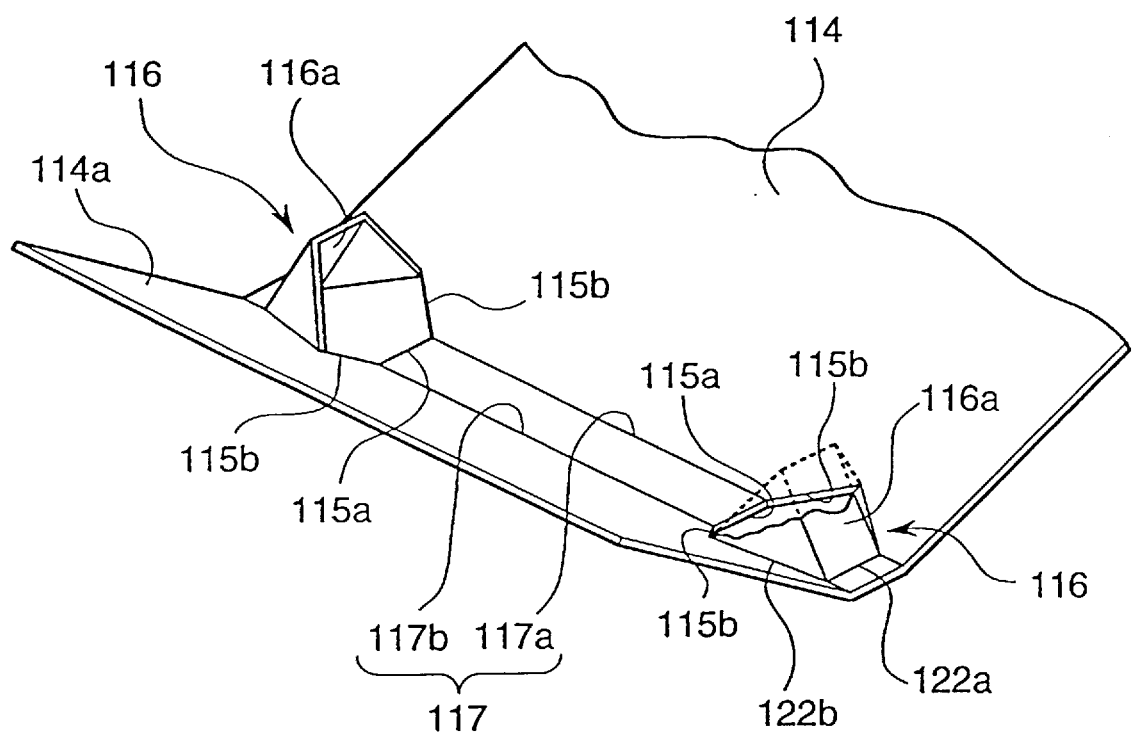
FIG. 6 is a perspective view of the outer box, illustrating a condition when opposite supporting pockets are lifted up.

FIG. 4 is an illustrative perspective view of another embodiment of a case for receiving disk-type recording medium according to the present invention. Case 110 for receiving disk-type recording medium is a box-type case for storing a disk-type recording medium 111 in a sealed condition and may be made mainly from thick paper or plastic sheet. Case 110 consists of an outer case 112 and an inner case 113 to be received in the outer case 112. FIG. 5 illustrates the development of the outer case 112 prepared from a rectangular punched sheet 114 of thick paper. FIGS. 4 and 6 illustrate how the punched sheet 114 is folded. The rectangular punched sheet 114 has a central portion delimited by a transverse length "W" which is a little longer than a diameter "D" of a disk 111 to be received. The ends of the central portion are turned up at respective creases 117a, 117b and 118a, 118b to form respective folded portions 117, 118 each having a nearly U-shaped cross section. One folded end has two cut lines 115, 116 spaced at a predetermined distance "E".

FIG. 6 illustrates the formation of two pockets 116 for receiving and supporting the inner case 113. Pockets are turned up from respective cut lines 115.

Two cut lines 115 form a top 115a and two sides 115b of a trapezoid. The two tops 115a of the trapezoids face each other. The tops are nearly the same height and length as a distance "S". A bottom side 115c is approximately three times longer than the distance "S".

FIG. 6 illustrates how opposite receiving faces 116a of the receiving pockets 116 may be turned up nearly perpendicularly with respect to a plane of the folded portion 117. The receiving pockets 116 are turned up at the cut lines 115, 115 and are folded at creases 122a and 122b and the folded portion 117 is folded inwards to have a nearly U-shaped cross section.

Figure 7:
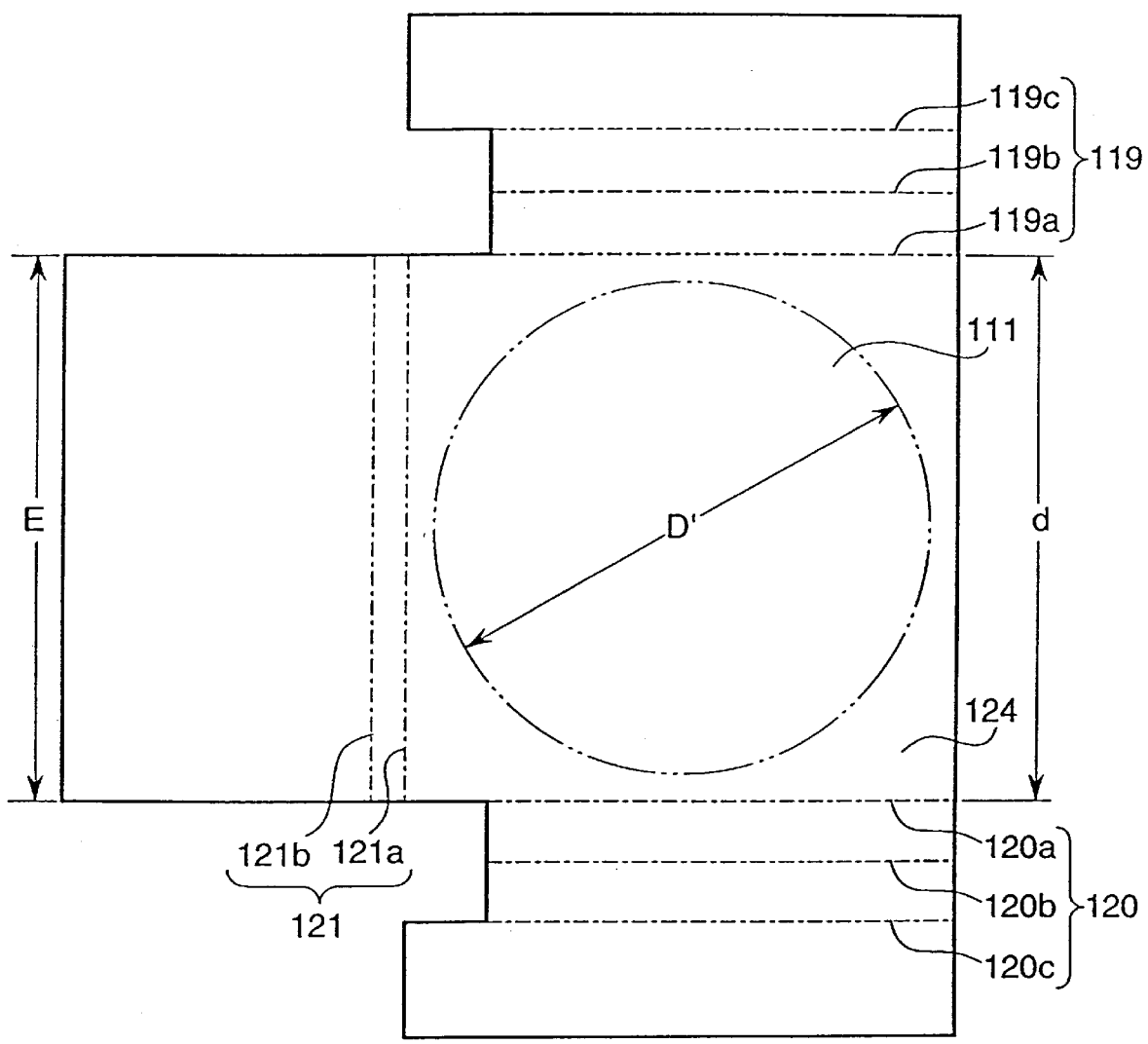
FIG. 7 is a development of an inner box used in the case shown in FIG. 4.
Figure 8:
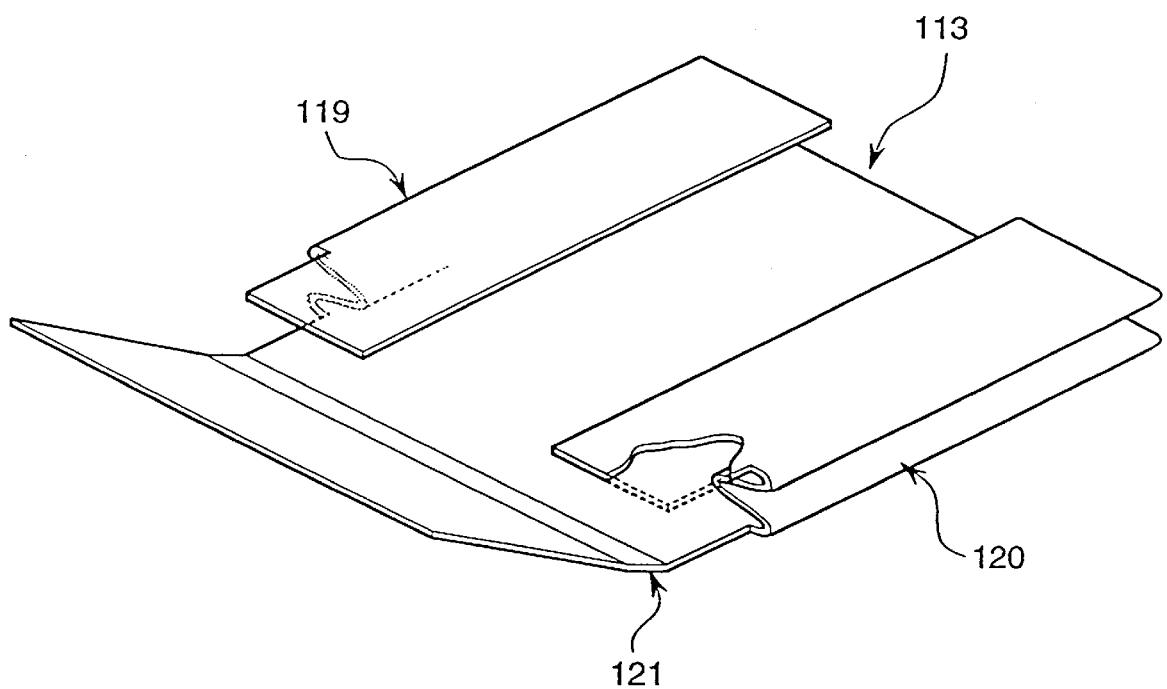
FIG. 8 is an illustrative perspective view of the shaped inner box.

FIG. 7 illustrates the preparation of inner box 113 from a punched sheet 124. FIG. 8 illustrates the folding of the punched sheet 124. The punched sheet 124 has a central portion, width "d", which is nearly equal to the diameter "D" of the disk 111 to be contained. Opposite ends of the central portion are folded inwards at creases 119a, 119b, 119c and 120a, 122b, 120c, so as to have a cross section of bellows. A left side of the punched sheet 124 is also folded inwards at two creases 121a and 121b, which form a folded portion 121, with a width "E" which is equal to a distance between opposite receiving faces 116a of the receiving pockets 116.

Inner case 113 is insertable into an outer case 112. The folded portion 121 of the inner case 113 is inserted into a space between opposite receiving faces 116a of the receiving pockets 116 while the folded portion 117 of the outer case 112 is deformed or folded into a nearly U-shaped cross section.

Figure 9:
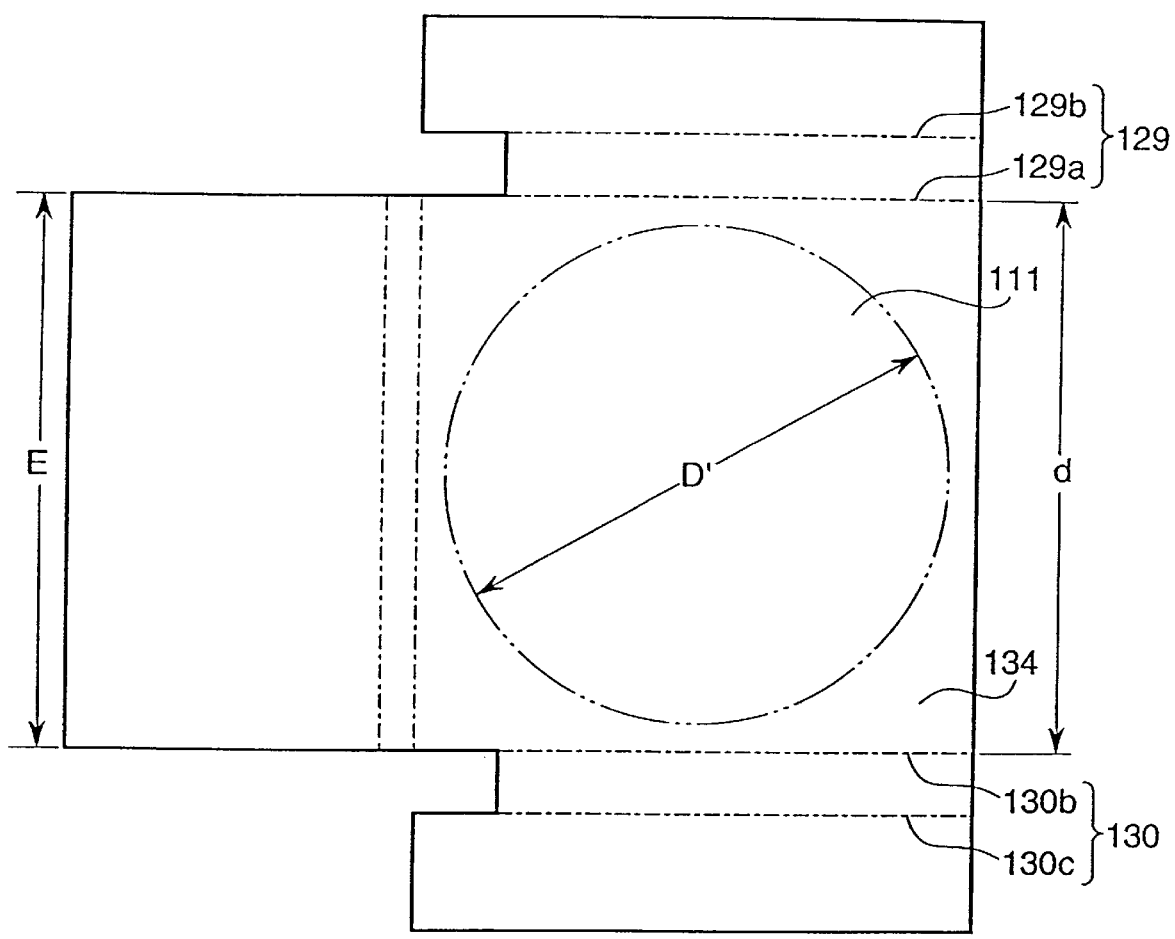
FIG. 9 shows a development of an inner box of another embodiment according to the present invention.

FIG. 9 illustrates a development of the inner case. Opposite wings of a punched sheet 134 are folded inwards at two creases 129a, 129b and 130a, 130b to form folded portions 129 and 130, each having a nearly U-shaped cross section, so that one disk can be stored between folded surfaces (bellows).

In this embodiment, each wing 114a, 114b of the outer case 112 has a slit 122a, 122b and a tongue 123a, 123b as is shown in FIG. 5. The tongues 123a and 123b are inserted into their respective slits 122a and 122b after a disk 111 is stored in the case.

EXAMPLE 3

Figure 10:
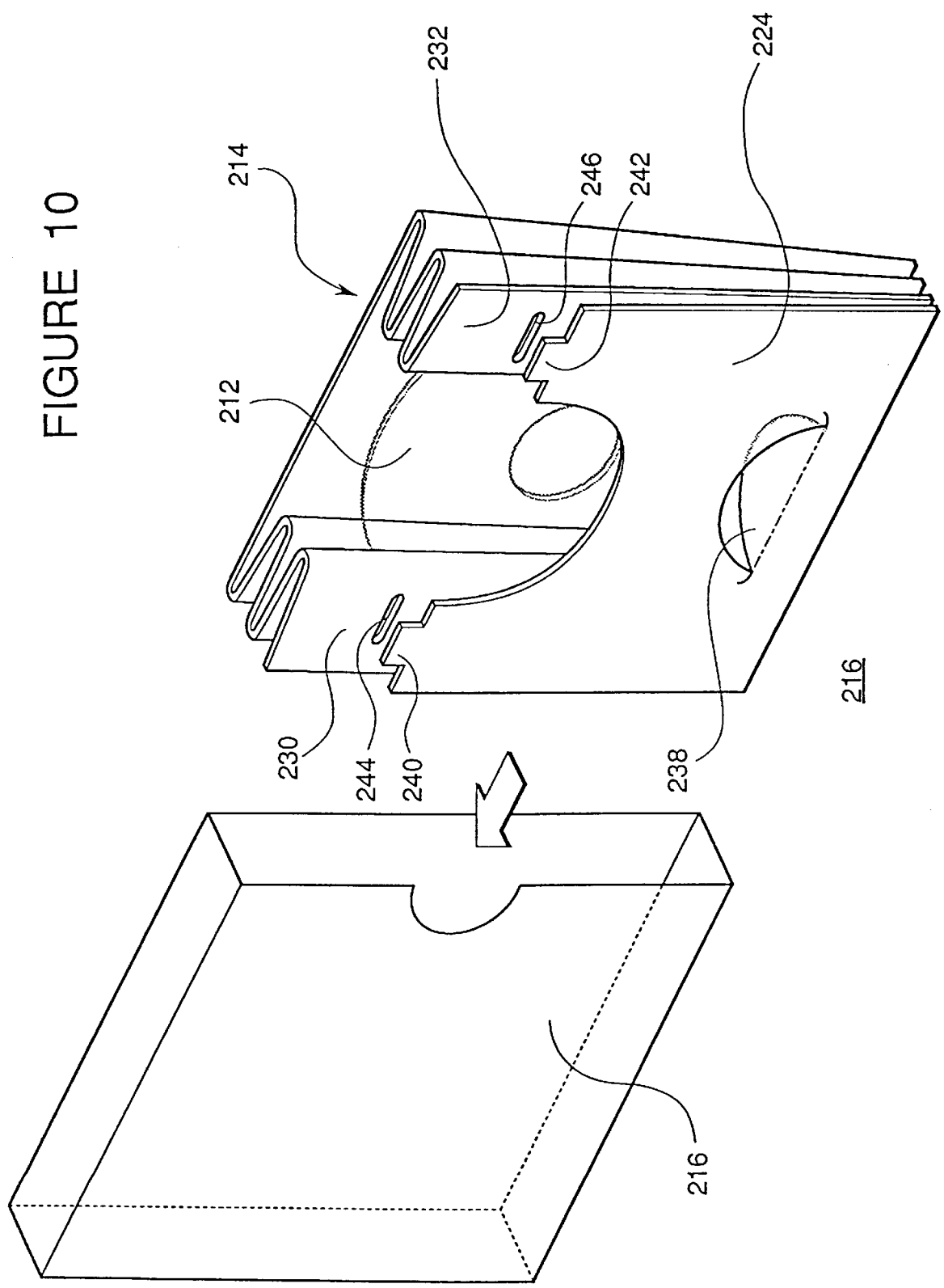
FIG. 10 is an illustrative perspective view of another embodiment of a case for disk-type recording medium according to the present invention.

FIG. 10 is an illustrative perspective view of another embodiment of a case 210 for receiving disk-type recording medium according to the present invention. This case 210 for receiving disk-type recording medium consists of an inner case 214 for storing a recording medium 212 and an outer case 116 for receiving the inner case 214. The outer case 216 has an opening at a side. In a variation, the outer case 215 may have a second opening opposite the first opening. The inner case 214 and the outer case 216 may be made of soft material such as thick paper.

Figure 11:
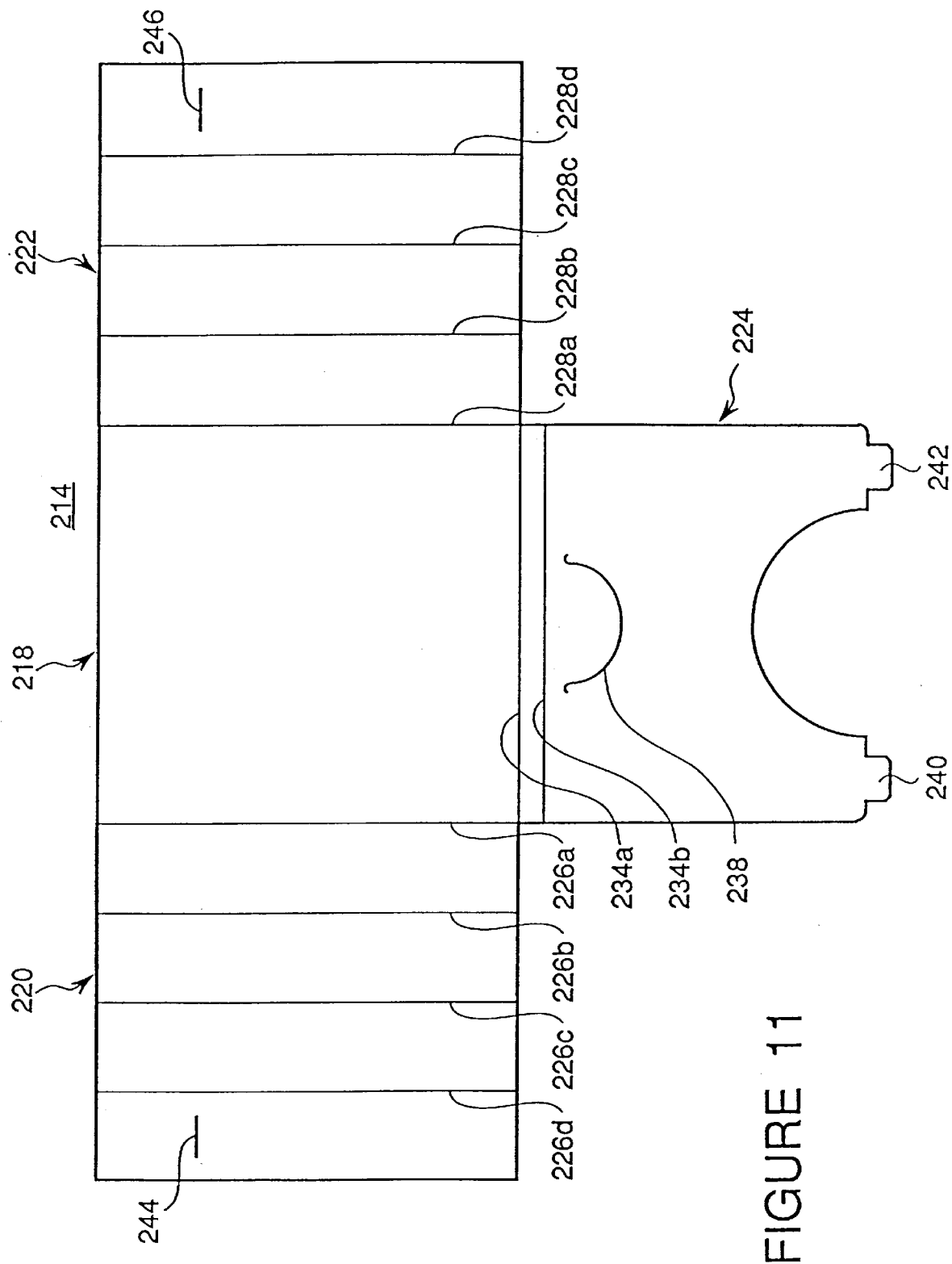
FIG. 11 is a development of an inner box used in the case shown in FIG. 10.

FIG. 11 illustrates the development of the inner case. The inner case 214 is prepared by folding a nearly T-shaped sheet punched out from a sheet of thick paper at creases. The inner case 214 consists of, in its development, a rectangular central portion 218, side wings 220, 222 extending left and right from the central portion 218 and a turn-up portion 224 extending downward from a side of the central portion 218.

Side wings 220,222 are folded four time at creases 226a to 226d; 228a to 228d to form bellows 230, 232 (FIG. 10). The turn-up portion 224 is folded inwards at creases 234a, 234b so as to cover the bellows 230, 232 (FIG. 10). The turn-up portion 224 has, at its top end, two tongues 240, 242 which are intended to be hooked into slits 244, 246 cut in the bellows 230, 232 (FIG. 11). In a variation, the turn-up portion 224 can be pasted to the bellows 230, 232 without slits 244, 246.

The bellows 230,232 may be deformed elastically against external forces and hence each recording medium which is held between bellows 230, 232 is floated from the central portion 218 and hence is protected from damage and deformation caused by accidental forces.

As illustrated in FIGS. 10 and 11, the turn-up portion 224 has, near to its base, a cut line along which a stopper 238 is turned up inwards. An edge of the recording medium 212 is abutted to the stopper 238, so that the recording medium 212 held between bellows 230,232 does not move freely. In a variation, the stopper 238 may be formed from the central portion 218.

Figure 12:
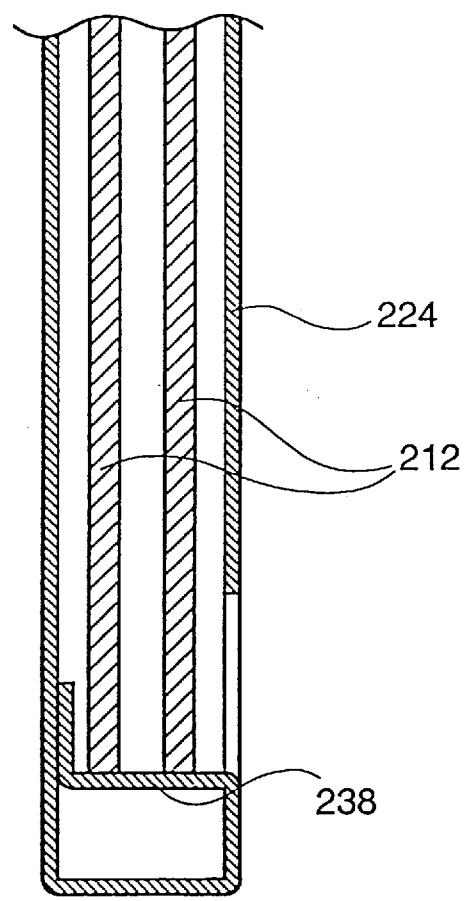
FIG. 12 and FIG. 13 are illustrative cross sectional views in the neighborhood of the stopper.
Figure 13:
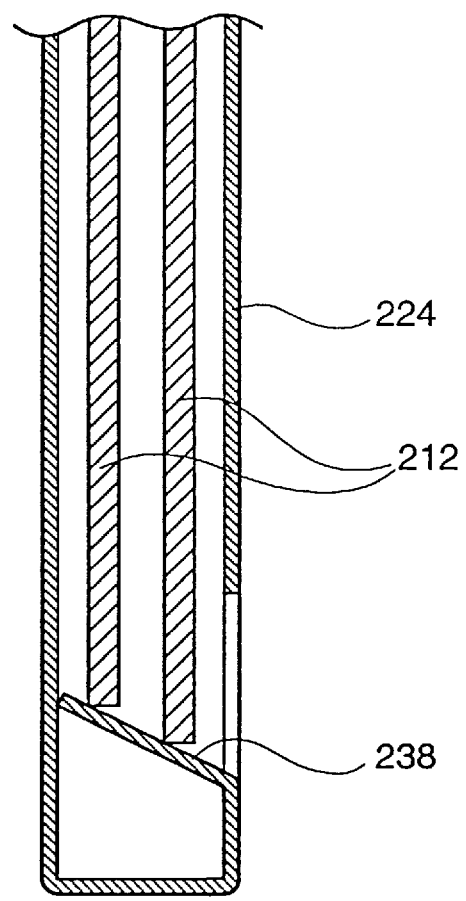

FIGS. 12 and 13 illustrate how the recording media 212 is abutted at its edge to the stopper 238. In FIG. 12, recording media 212 is abutted to a stopper 238 which is nearly perpendicular to the recording media 212. FIG. 13 illustrates a variation of recording media 212 which is abutted at its edges to a stopper 238 which is inclined to the recording media 212.

Figure 14:
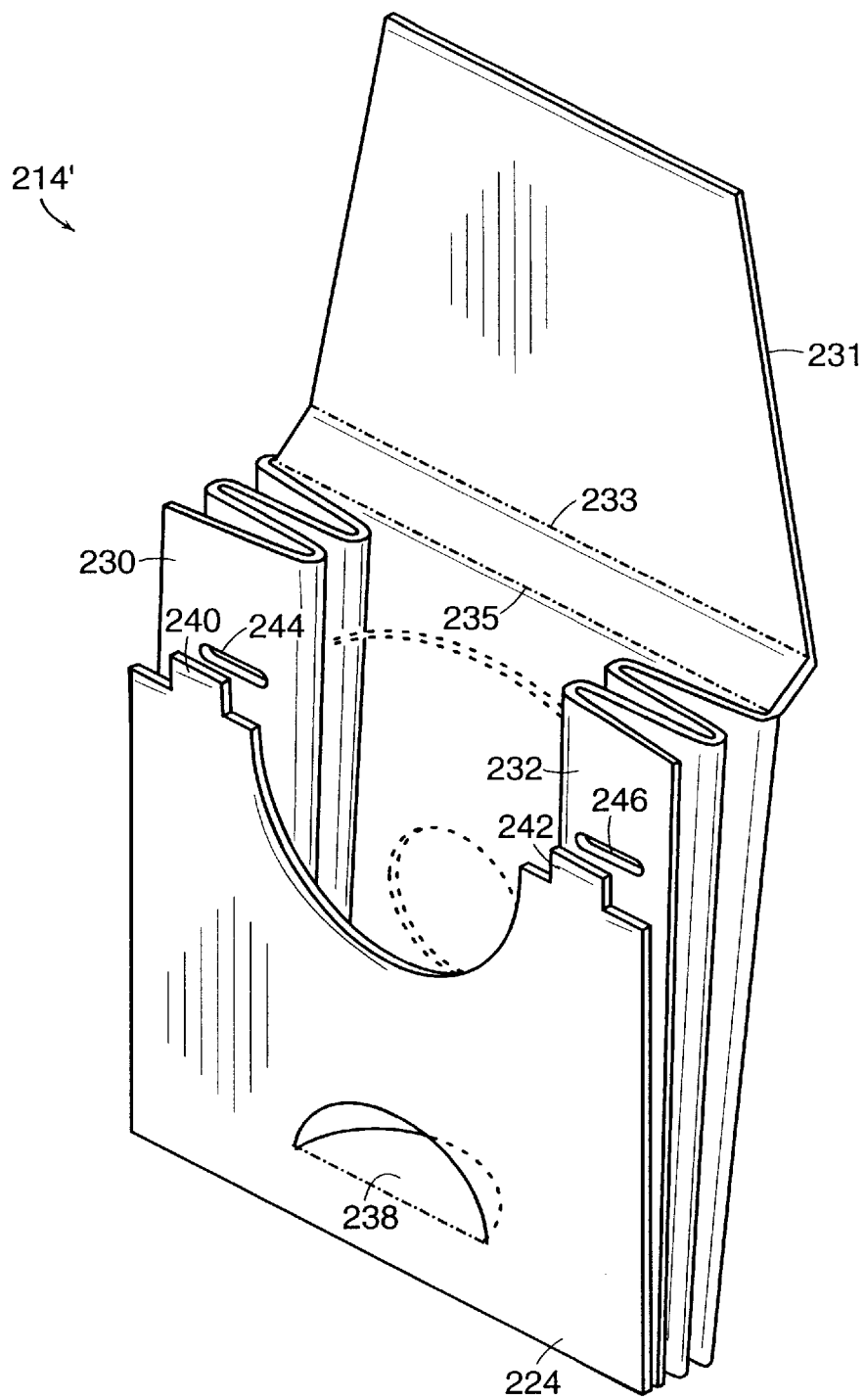
FIG. 14 is an illustrative perspective view of another embodiment of a case for disk-type recording medium according to the present invention.
Figure 15:
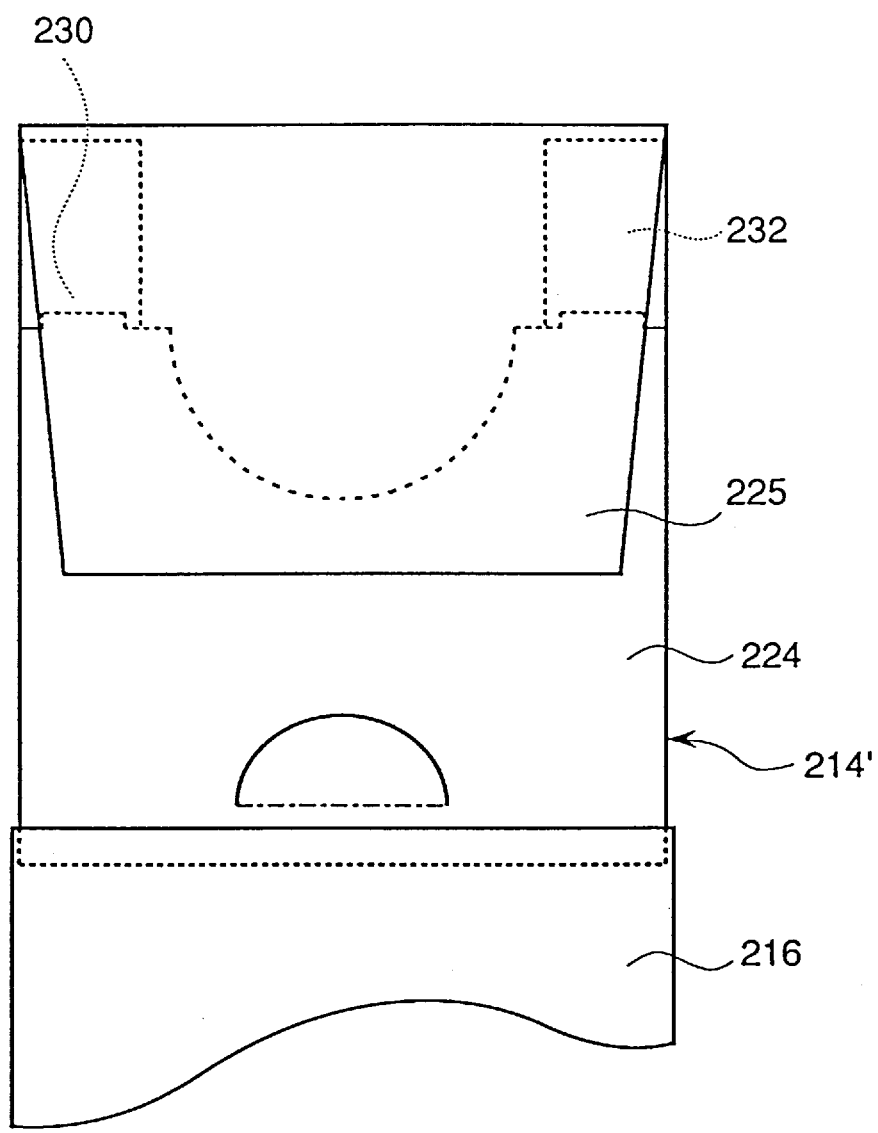
FIG. 15 illustrates how insert an inner case into the outer case shown in FIG. 14.

FIGS. 14 and 15 illustrate another embodiment of the inner case 214 of FIG. 10

EXAMPLE 4

An inner case 214 of FIG. 14 has a lid 225 for dosing an opening through which a recording medium 212 is inserted. This lid 225 has a width extending over opposite bellows 230 and 232 and is folded over the bellows 230 and 232 to protect the recording medium 212.

When the inner case 214 is inserted into the outer case 216, the lid 225 is folded over the opposite bellows 230 and 232 and then is inserted into the outer case 216 as is illustrate in FIG. 15. Since the lid 225 covers and compresses the bellows 230 and 232, the free ends of the bellows 230 and 232 are not caught by the outer case 216 during insertion, the inner case 214 can be inserted smoothly and easily into the outer case 216.

Lid 225 of the inner case 214 reduces the exposed area of the recording medium 212 and hence reduces possibility of contact with the recording medium 212. With lid 225, the recording medium 212 is protected at all its periphery.

Figure 16:
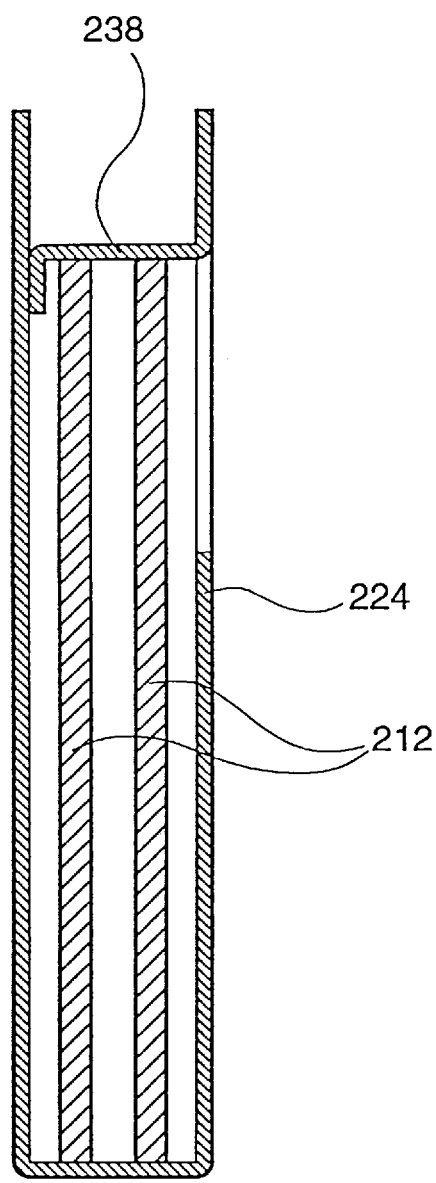
FIGS. 16 to 18 are illustrative cross sectional views in the neighborhood of the stopper.
Figure 17:
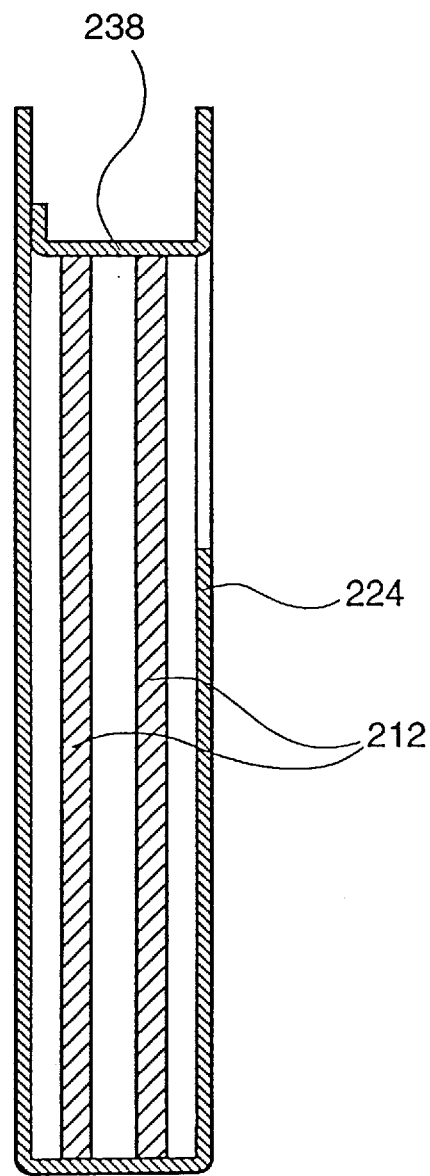
Figure 18:
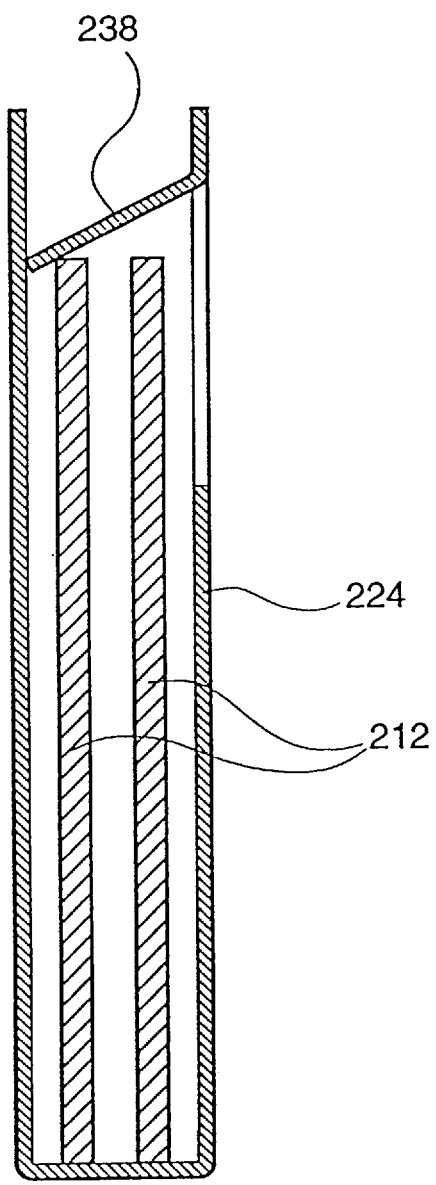

FIG. 16 is a cross section illustrating that the stopper 238 is formed near to the top end of the turn-up portion 224 so that a recording medium 212 abuts to the stopper 238. FIGS. 16 and 17 illustrate recording media 212 abutted to a stopper 238 which is nearly vertical to the recording media 212. FIG. 18 illustrates recording media 212 abutted at their edges to a stopper 238 which is inclined to the recording media 212. In the embodiment shown in FIGS. 16 to 19, the stopper 238 is folded inwards at 180° before the recording medium 212 is inserted and then is permitted to release onto an edge of the inserted recording medium 212.

EXAMPLE 5

Figure 19:
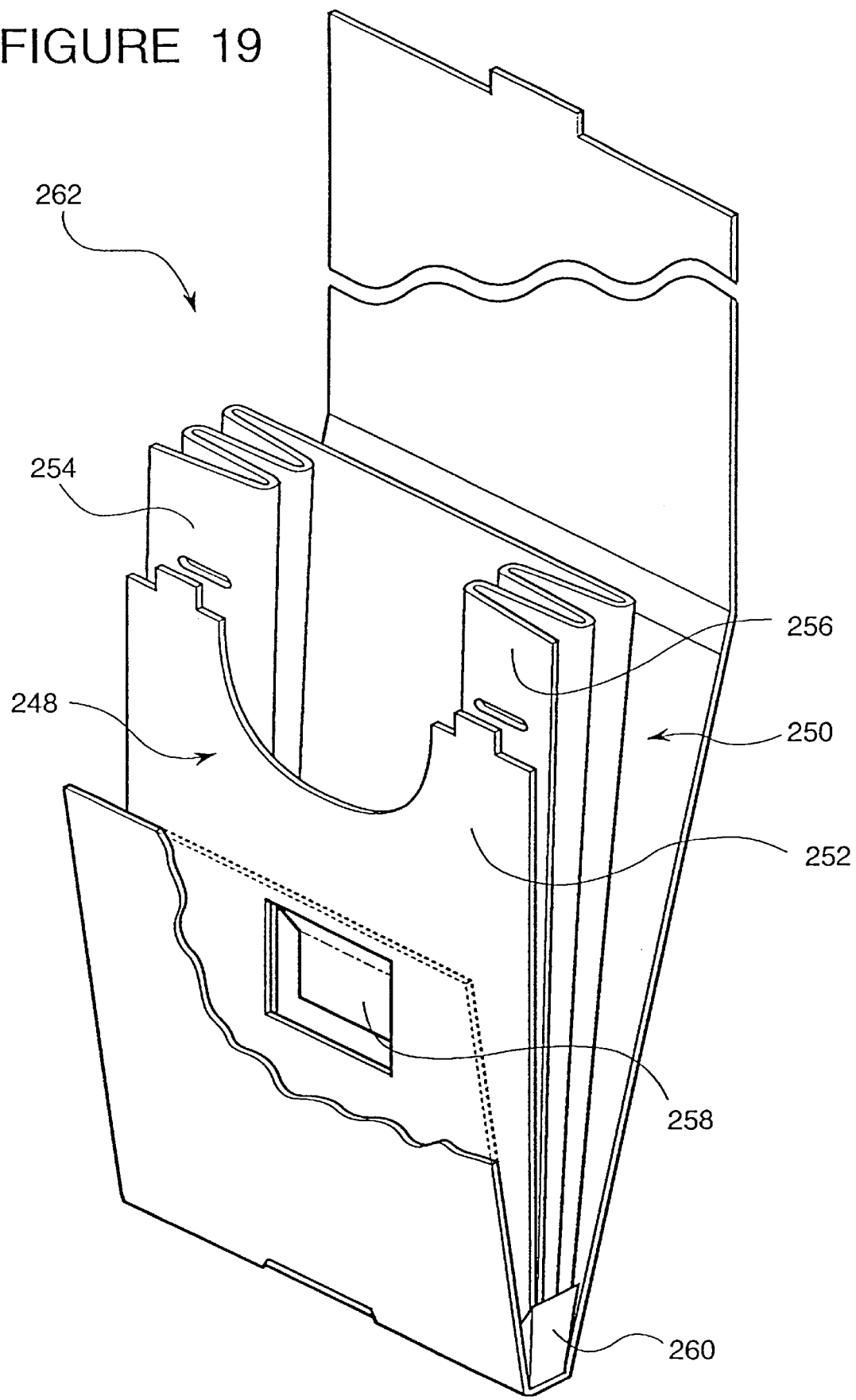
FIG. 19 is an illustrative perspective view of another embodiment of a case for disk-type recording medium according to the present invention.
Figure 20:
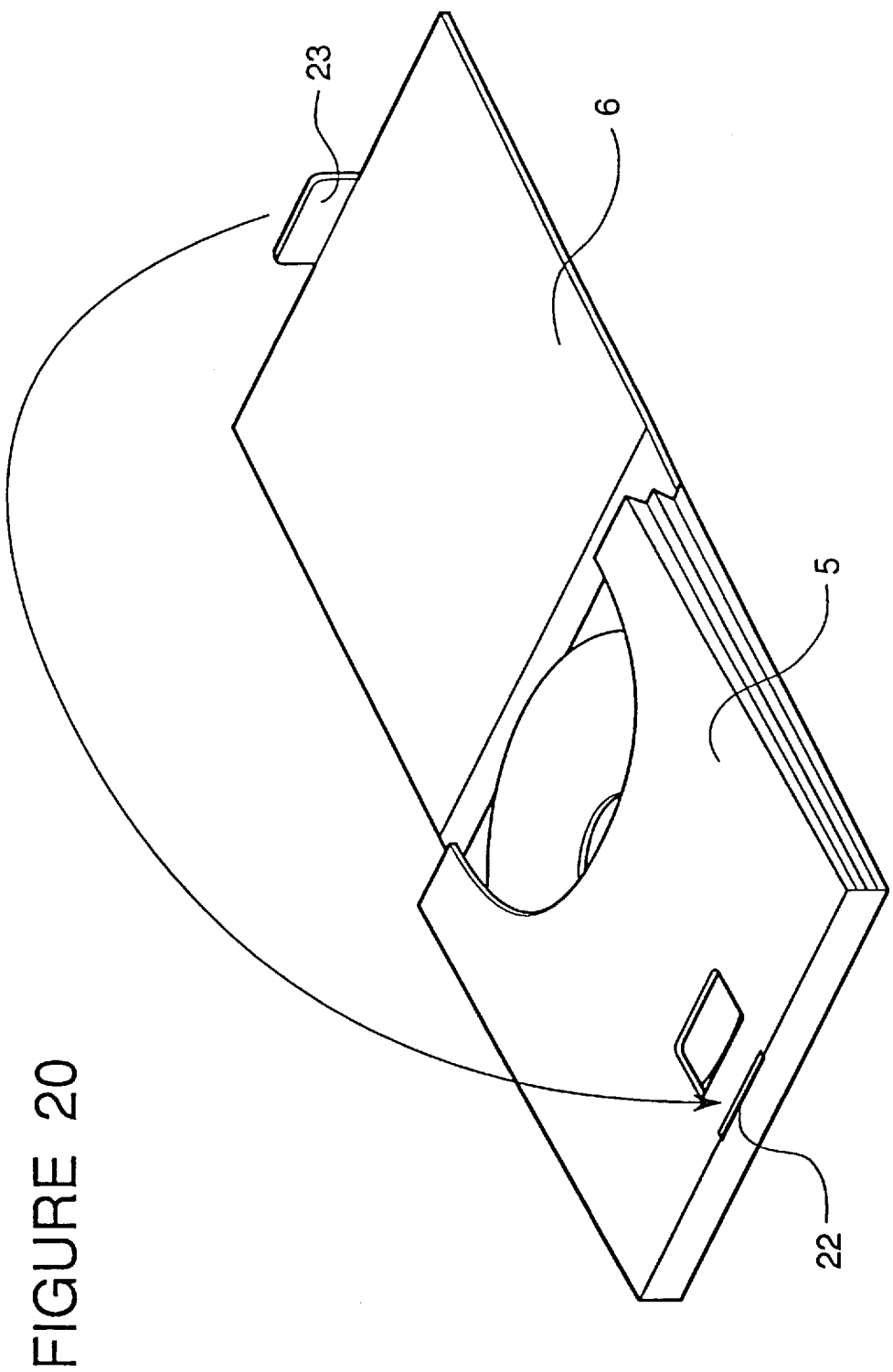
FIG. 20 is a variation of Example 1 in which an upper lid includes a tongue which is intended to be inserted to a slit formed in the lower lid.
Figure 21:
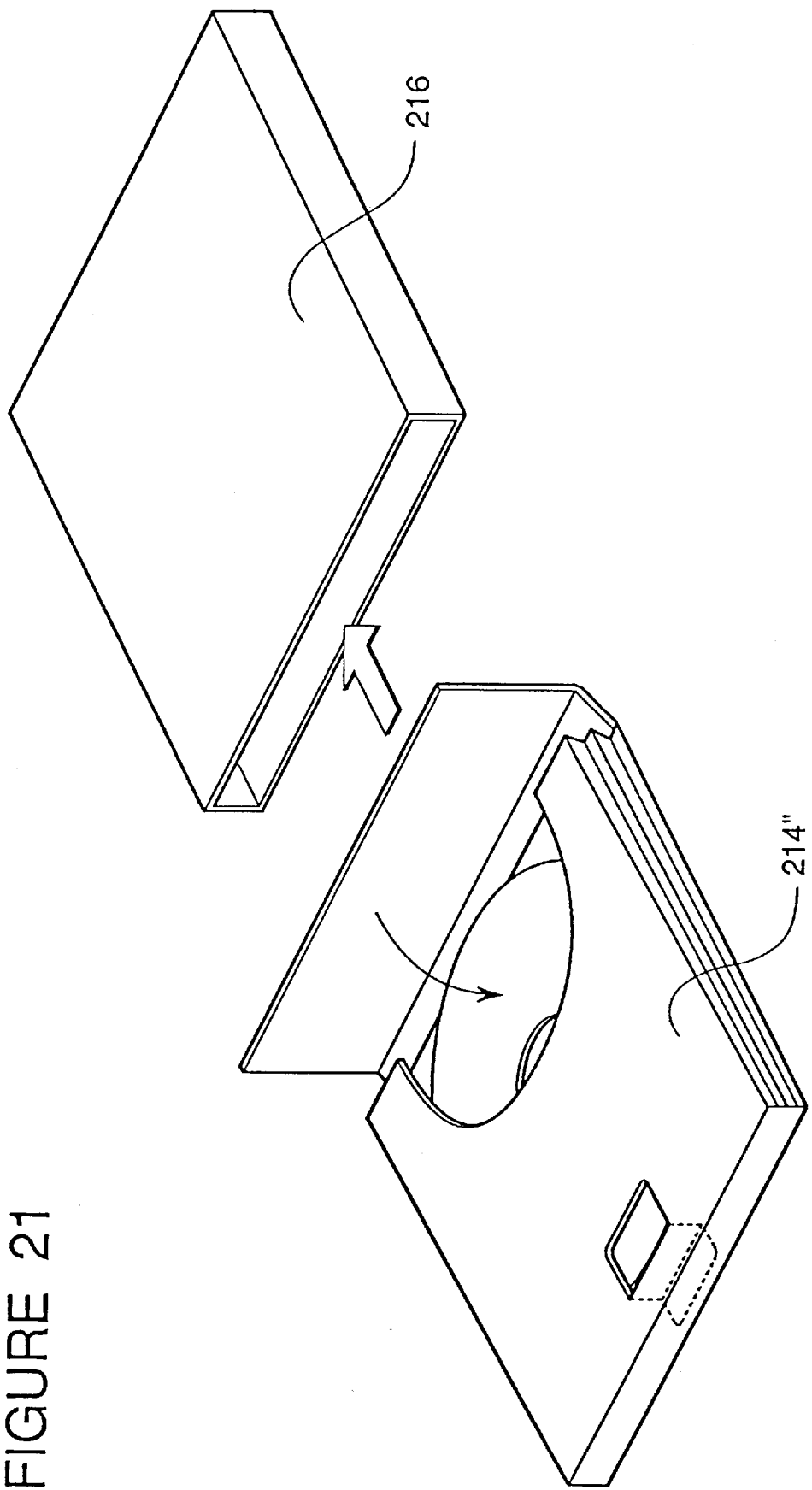
FIG. 21 illustrates a variation of Example 4 in which an inner case is inserted into an outer case.
Figure 22:
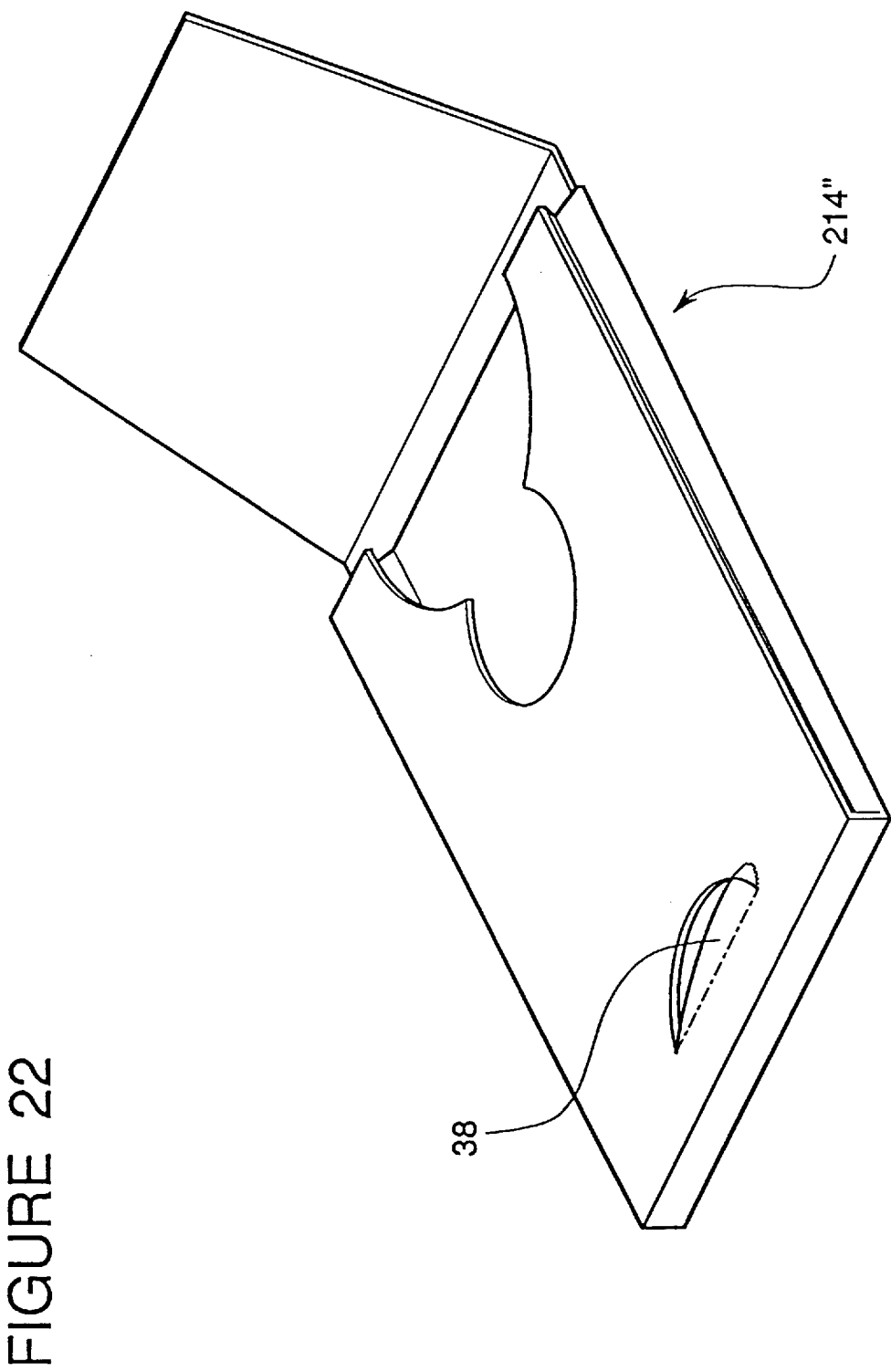
FIG. 22 illustrates a variation of the inner case illustrated in FIG. 21 in which the inner case has a different shape and a different stopper.
Figure 23:
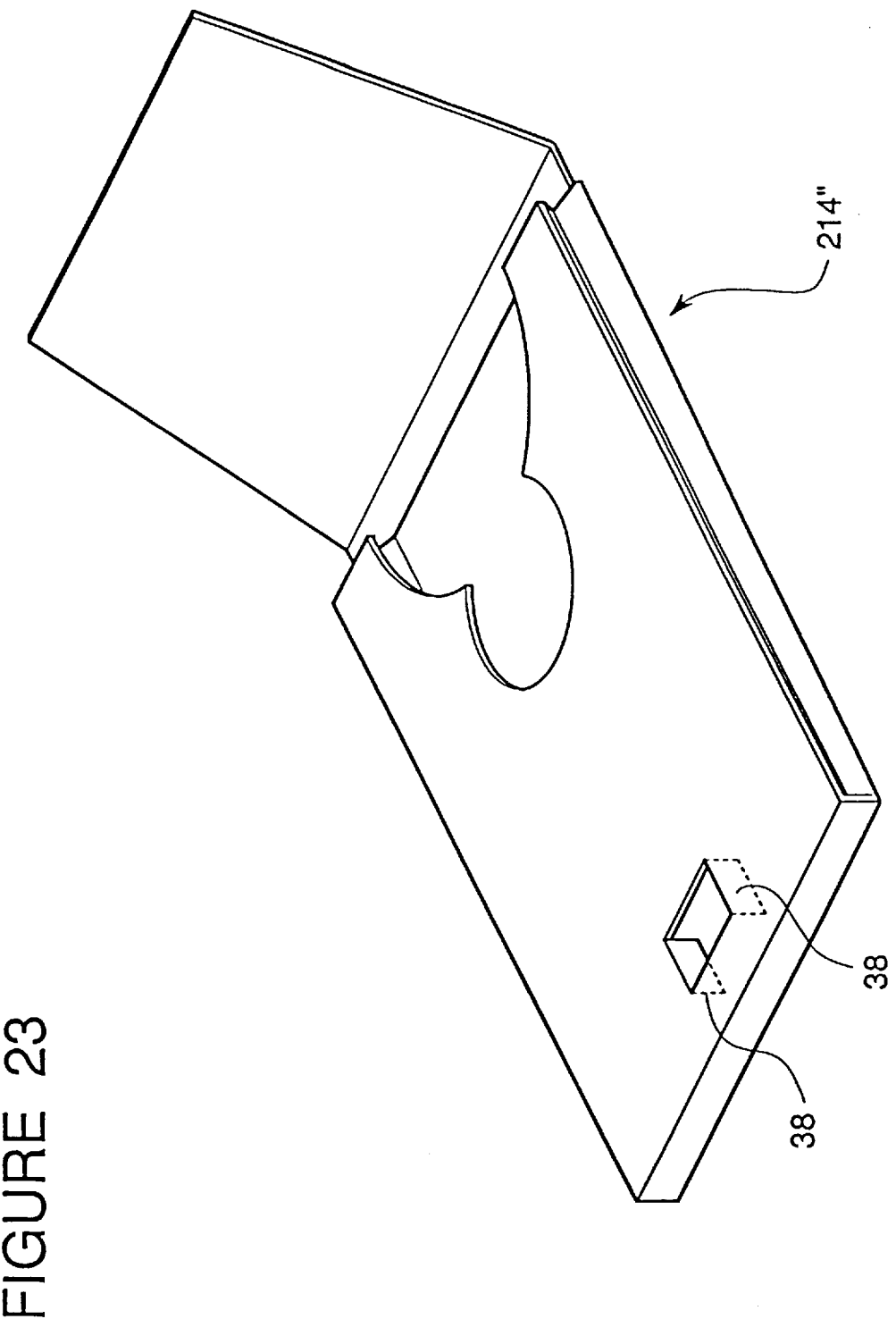
FIG. 23 illustrates a variation of FIG. 22 in which two stoppers are turned inwards.
Figure 24:
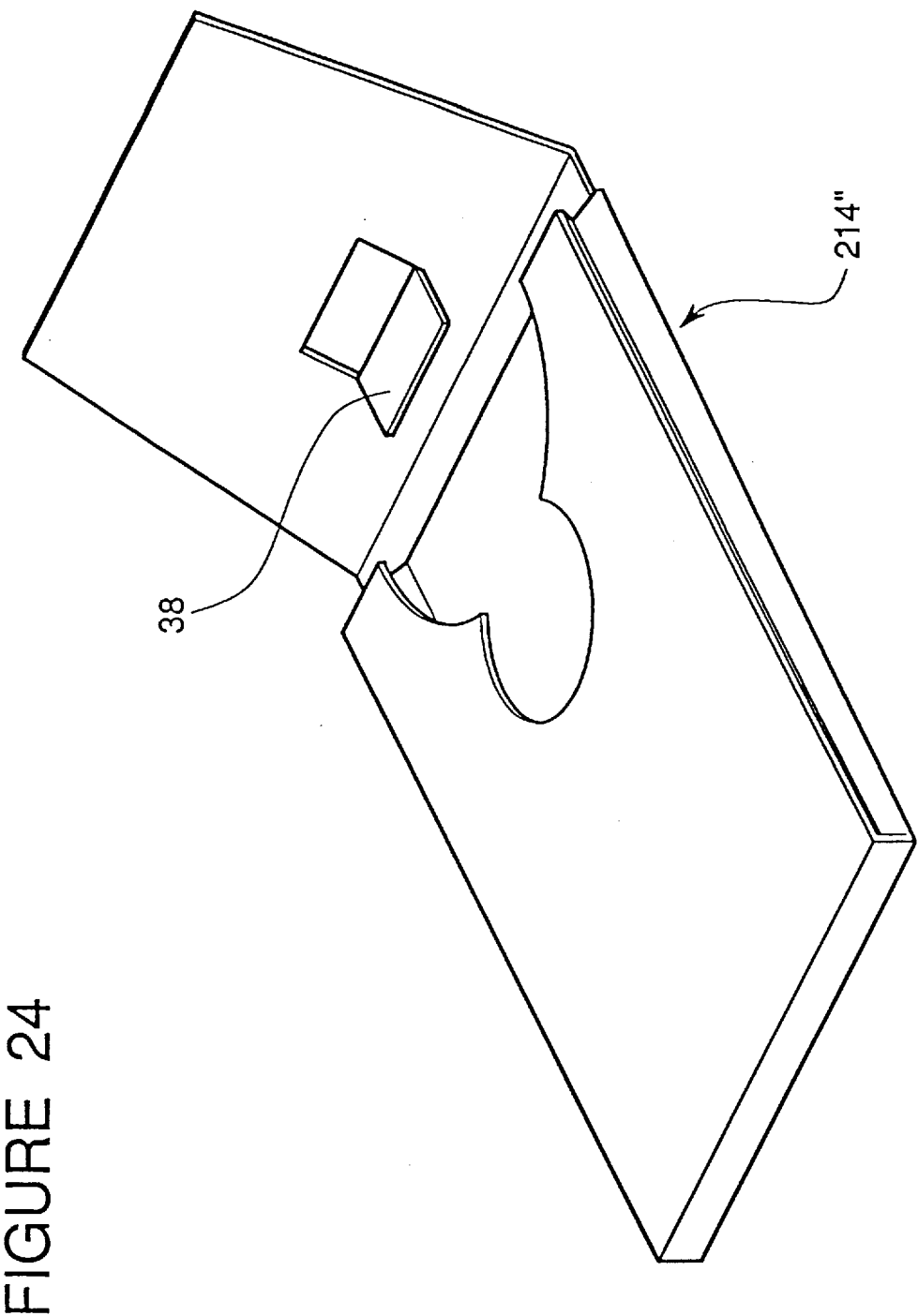
FIG. 24 illustrates another variation of FIG. 22 in which a stopper is formed in an upper lid.
Figure 25:
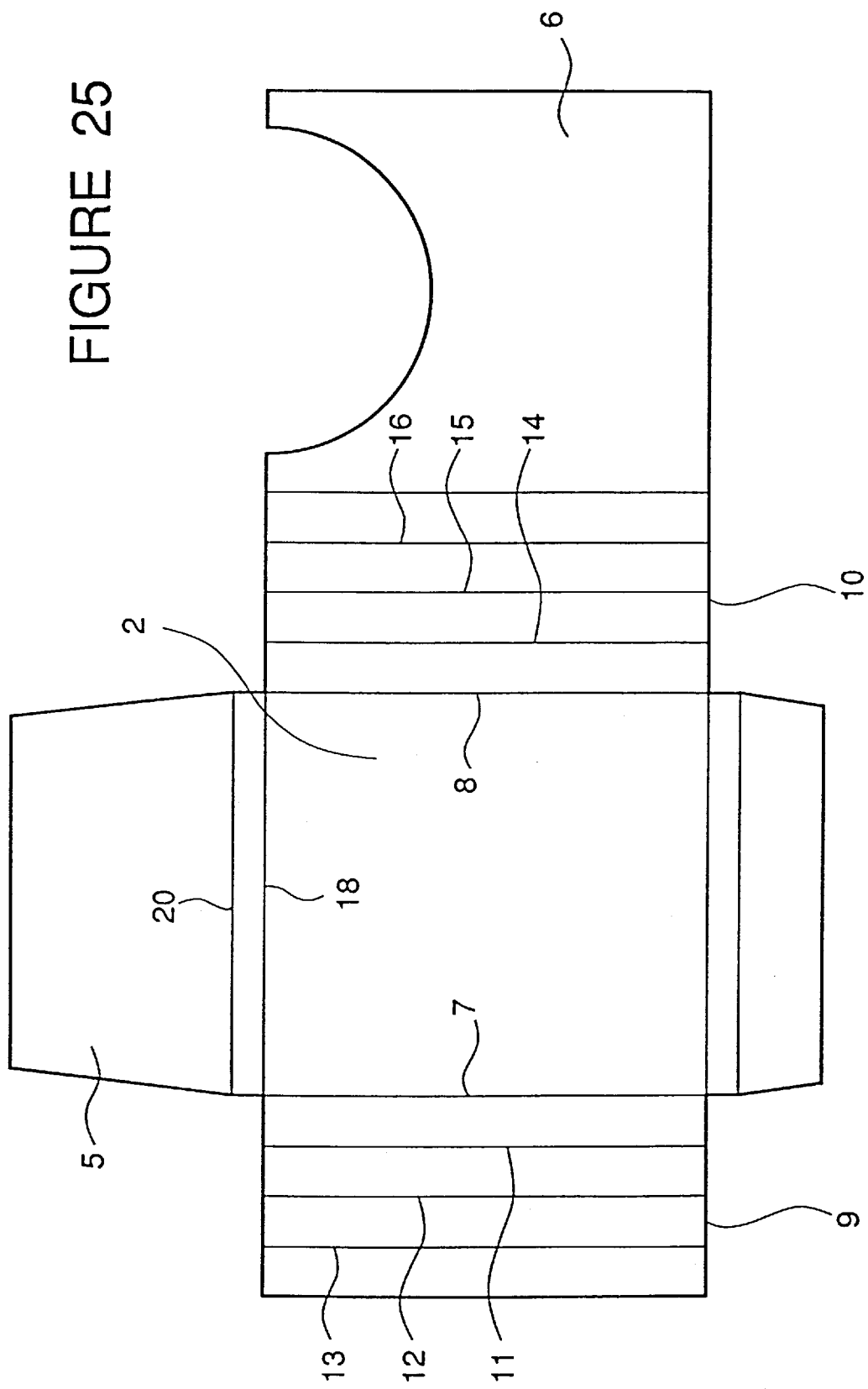
FIGS. 25 and 26 illustrate a development of an embodiment of the present invention.
Figure 26:
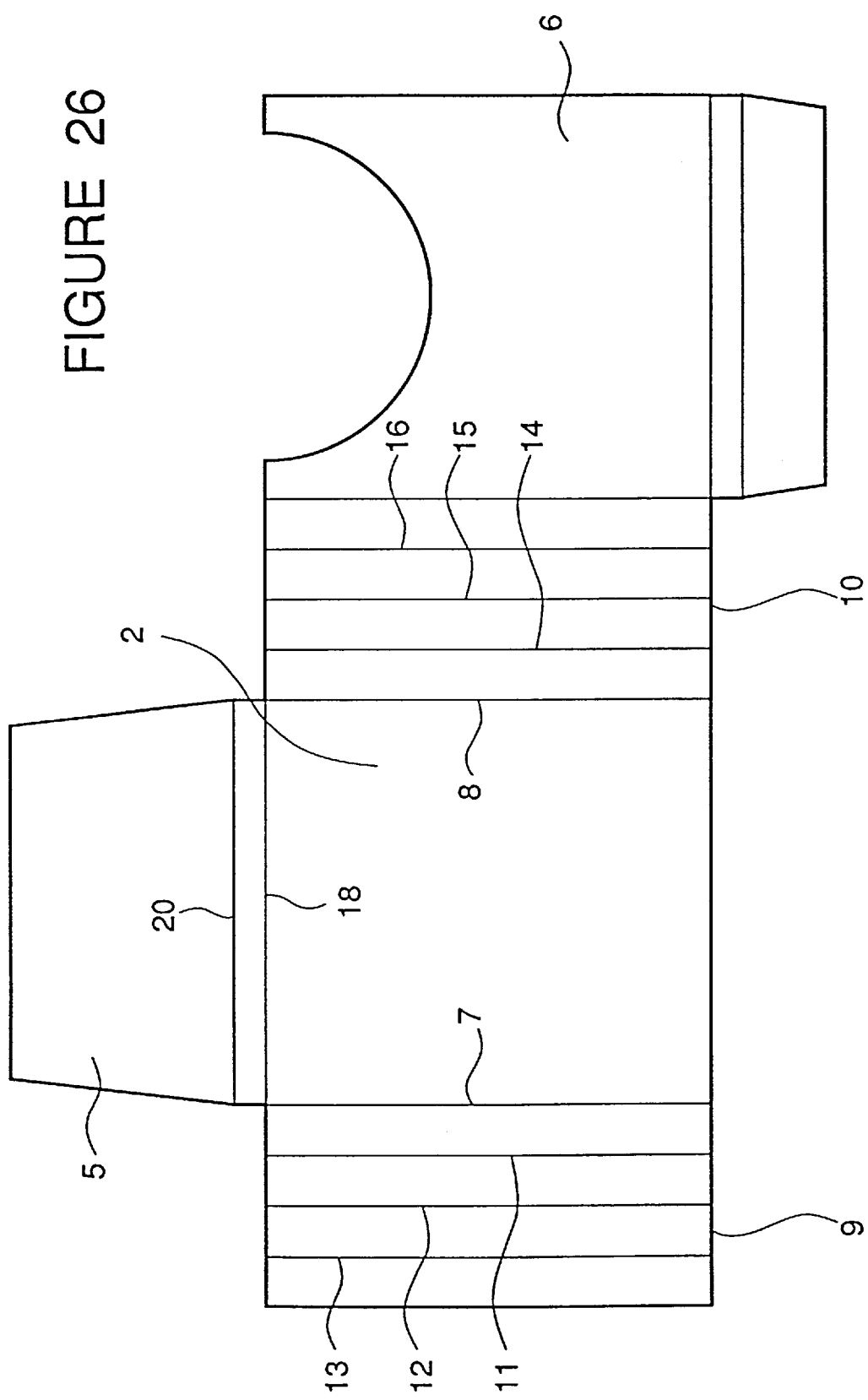

FIG. 19 illustrates a case 262 for a micro-compact disk (MCD) according to the present invention. This disk case 262 also consists of an inner case 248 and an outer case 250. The height of the disk case may be extended intentionally so that the dimensions of the disk case are such that it will not readily fit into a shoplifter's pocket.

The inner case 248 has a turn-up portion 252 and bellows 254, 256 which are similar to those shown in Example 3. A stopper 258 is formed by turning inwards a portion cut along a line formed at an intermediate part of the turn-up portion 252.

The outer case 250 is prepared by folding an elongated (not shown), rectangular punched sheet at creases. Receiving pockets 260 are turn up at cut lines at one of folding portions, so that the inner case 248 is inserted and held between the receiving pockets 260.

EXAMPLE 6

Figure 27:
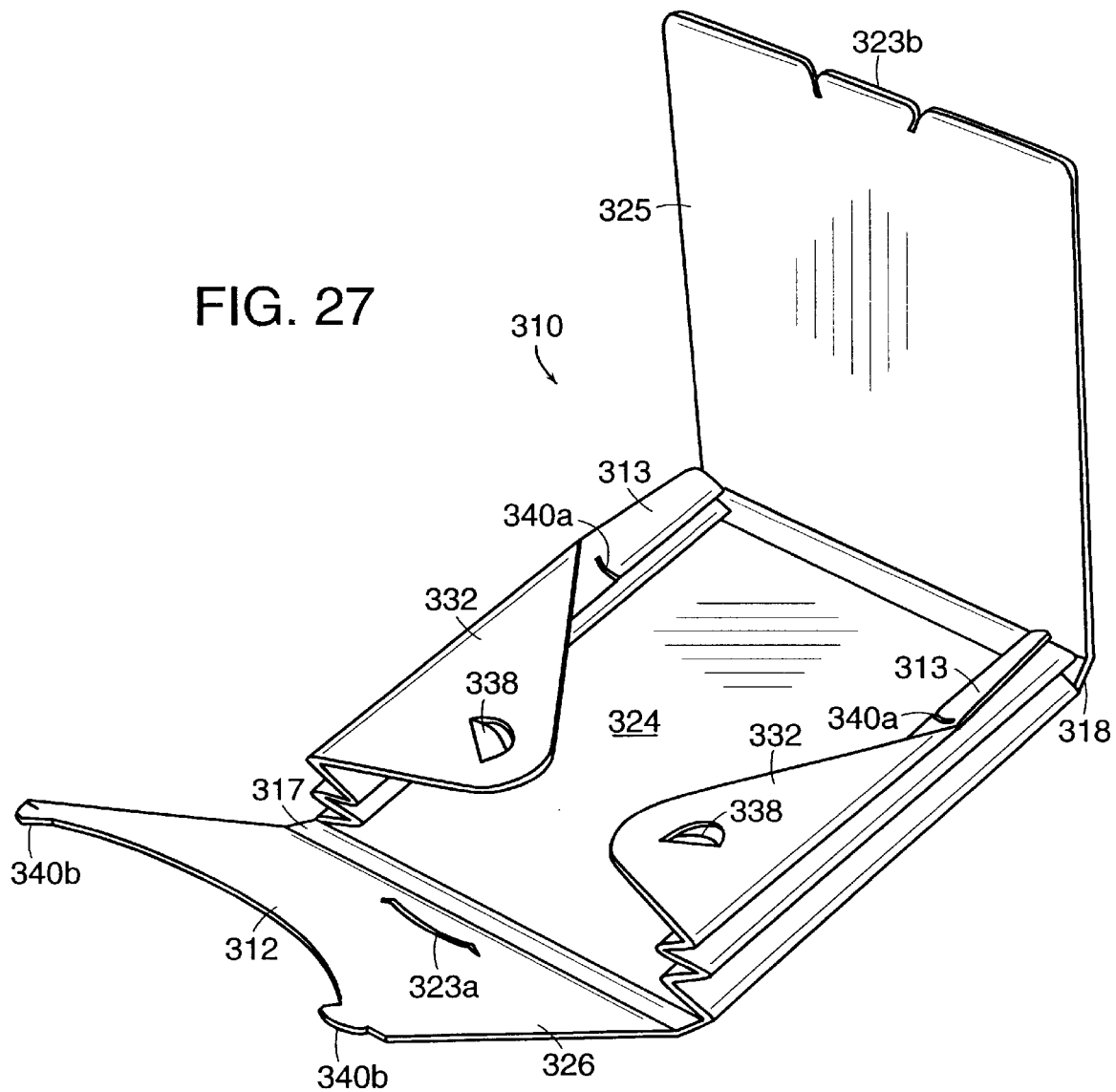
FIG. 27 is a perspective view of another embodiment of the case for disk-type recording medium according to the present invention.
Figure 28:
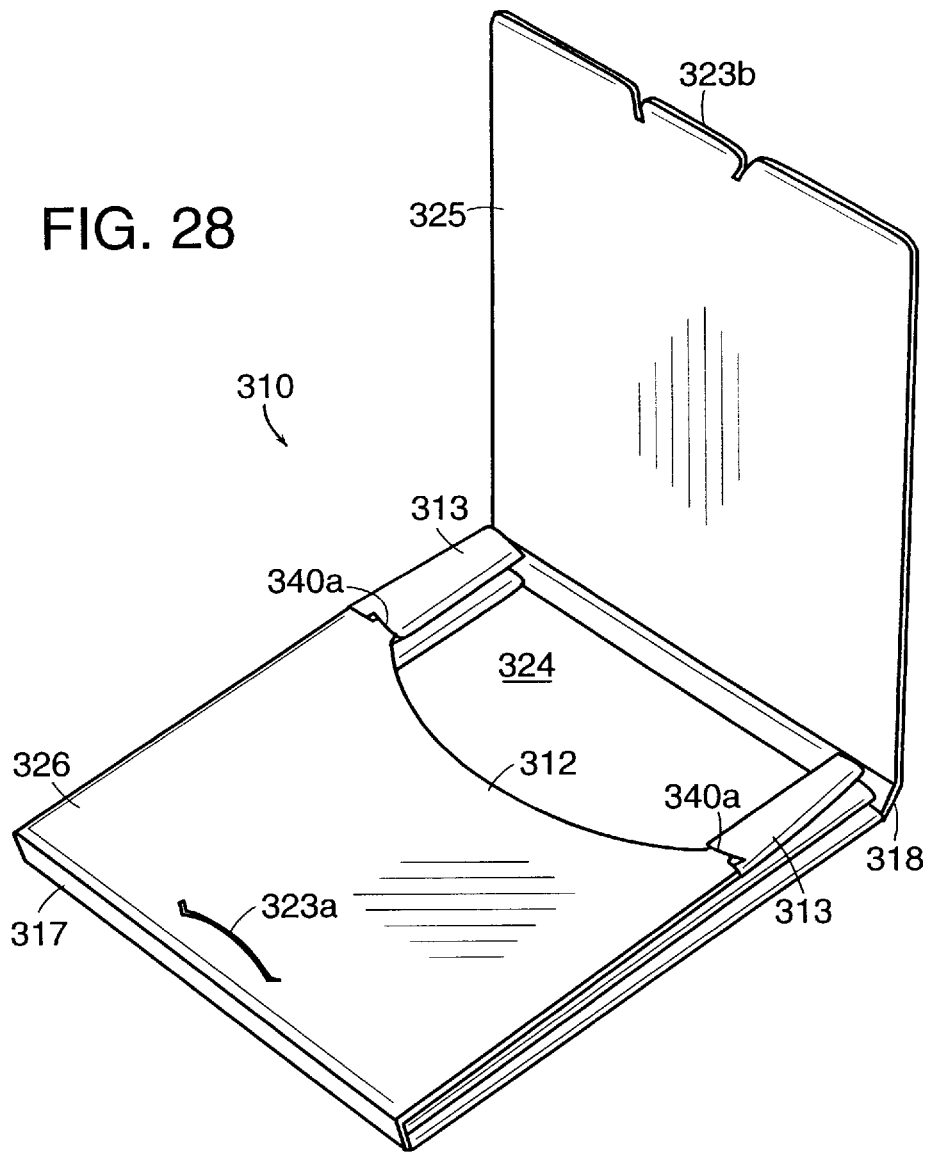
FIG. 28 is a perspective view of the completed case illustrated in FIG. 27.
Figure 29:
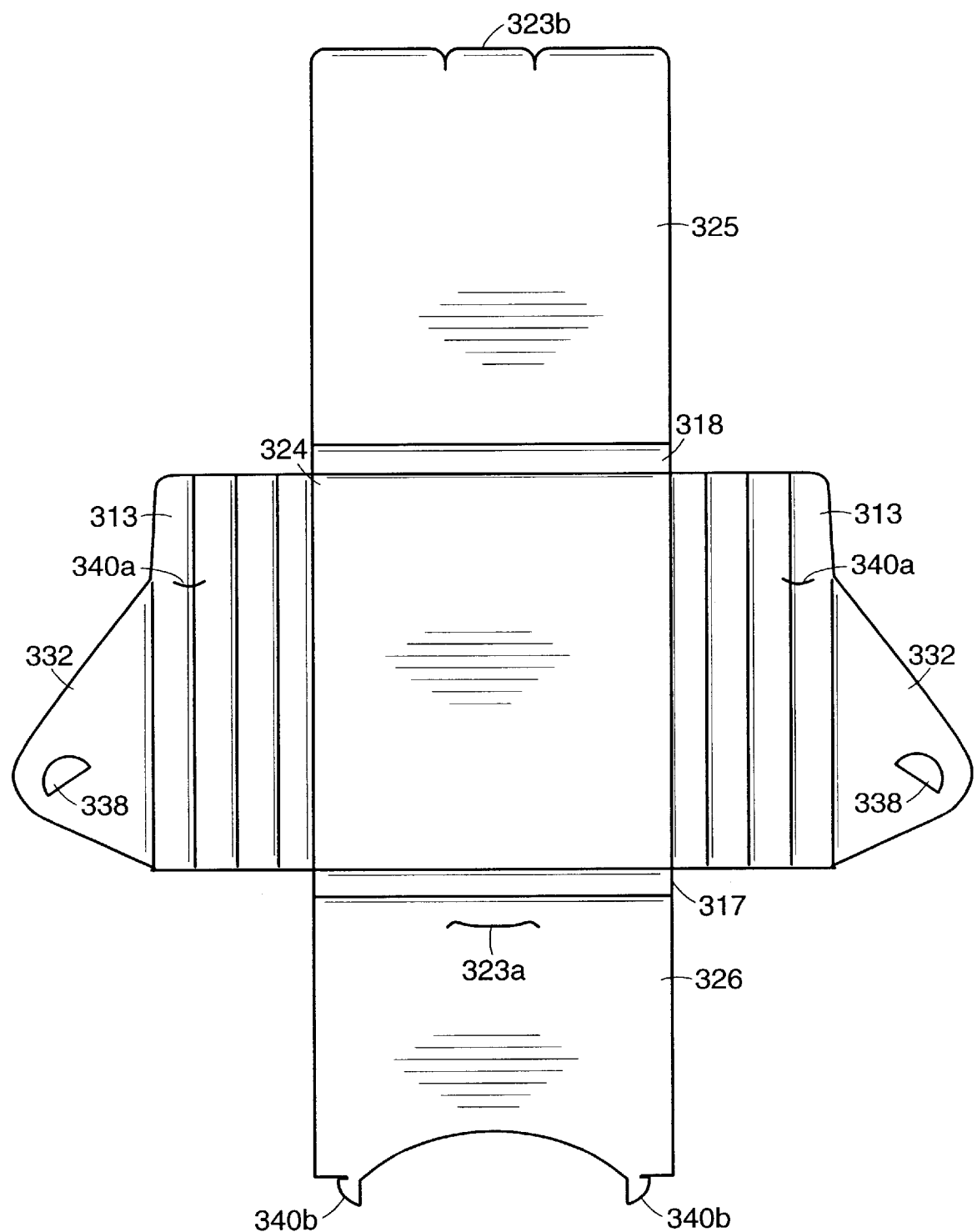
FIG. 29 is a view of a development of a cut sheet from which the case illustrated in FIG. 28 is made.
Figure 30:
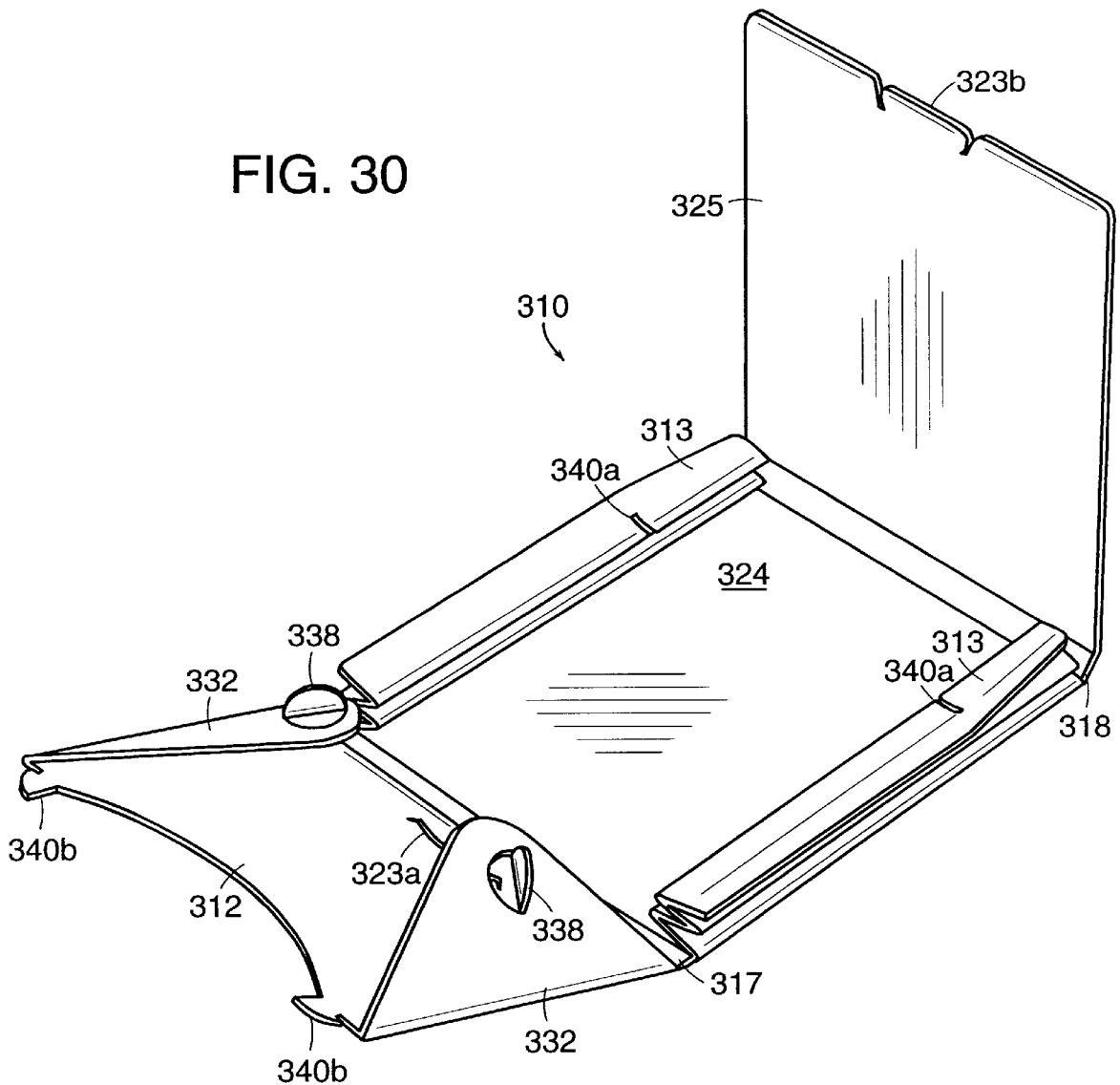
FIG. 30 shows an intermediate condition of fabricating the case of FIG. 27.

FIGS. 27 to 31 illustrate a variation of FIG. 14. FIG. 27 is a perspective view showing how a single sheet of flexible material is folded to form case 310. FIG. 28 illustrates a perspective view of the completed case 310 with flap 312 folded over extensions 332. FIG. 29 illustrates a plan view of a cut sheet from which case 310 may be made. FIG. 30 illustrates an intermediate condition of fabrication.

In this embodiment, represented by FIGS. 27 to 31, each side wing bellow 313 has an extension 332 at an outer margin (FIG. 29). Each extension 332 has a semicircular cut line 338 along which a stopper is turned up so that a recording medium is held elastically at its outer periphery.

During fabrication of the case, paired extensions 332 are folded inwards and then a bottom portion 312 is folded on the bellows prepared from the side wings 313. Tabs 340b of the bottom portion 312 are inserted into slits 340a formed in the bellows. Then, a lid 325, which is integrated with a disk receiving central portion 324, is folded on the bottom portion 312 and an engaging tab 323b formed in the lid 325 by parallel slits is inserted into a slit 323a formed in the bottom portion 312, so that the recording medium is contained in the case completely and securely.

In practice, a recording medium is inserted into the case by sliding it along the valleys of bellows 313. The medium is held by stoppers 338 elastically and is protected by the bottom portion 312 and by the lid 325 more securely than the case described in connection with FIG. 14. The case 310 alone can be used to store a recording medium but preferably is inserted into an outer case 216 (FIG. 10) so as to increase security during storage.

Figure 31:
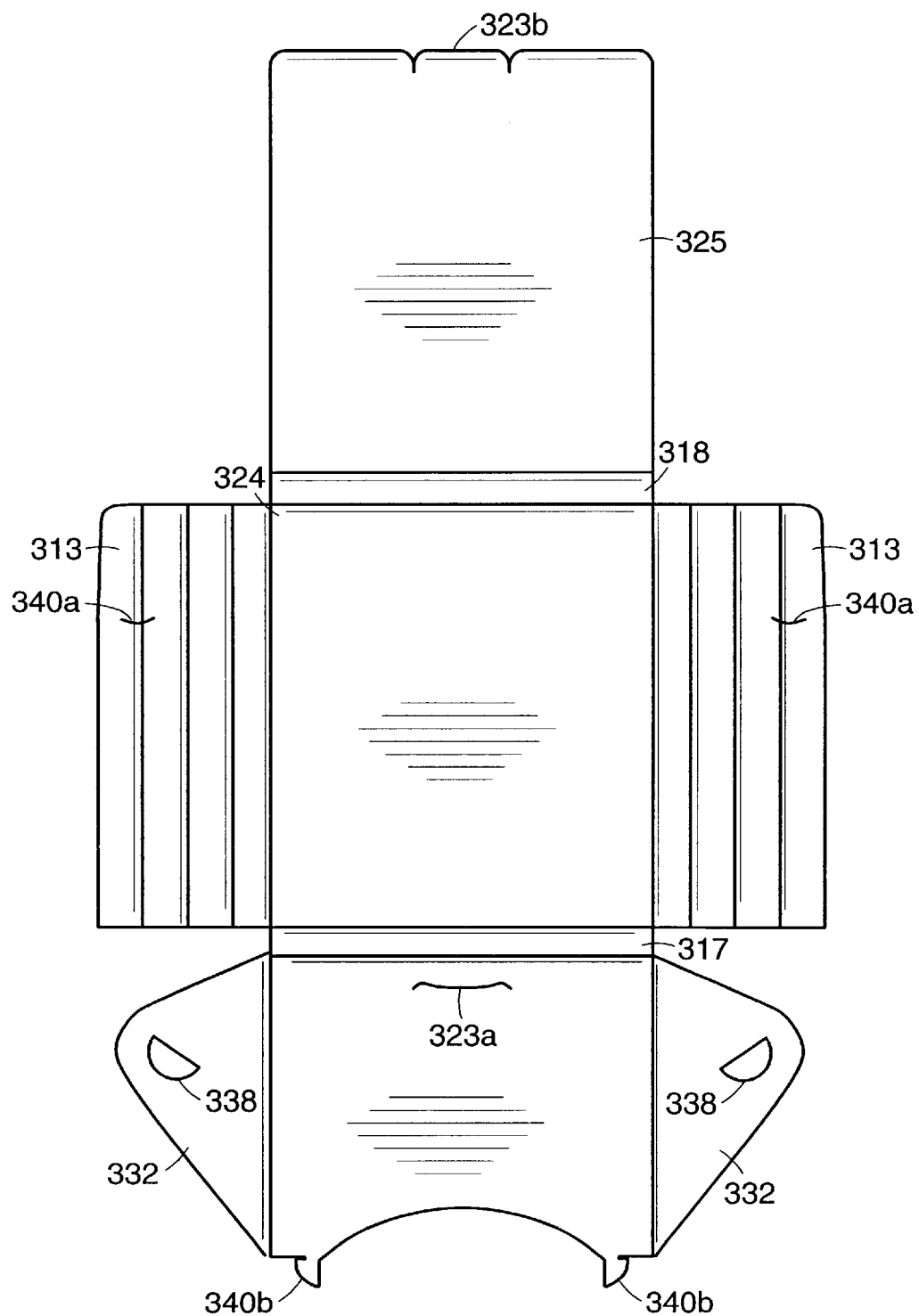
FIG. 31 is a view of a development of another cut sheet from which the case illustrated in FIG. 28 may be made.
Figure 32:
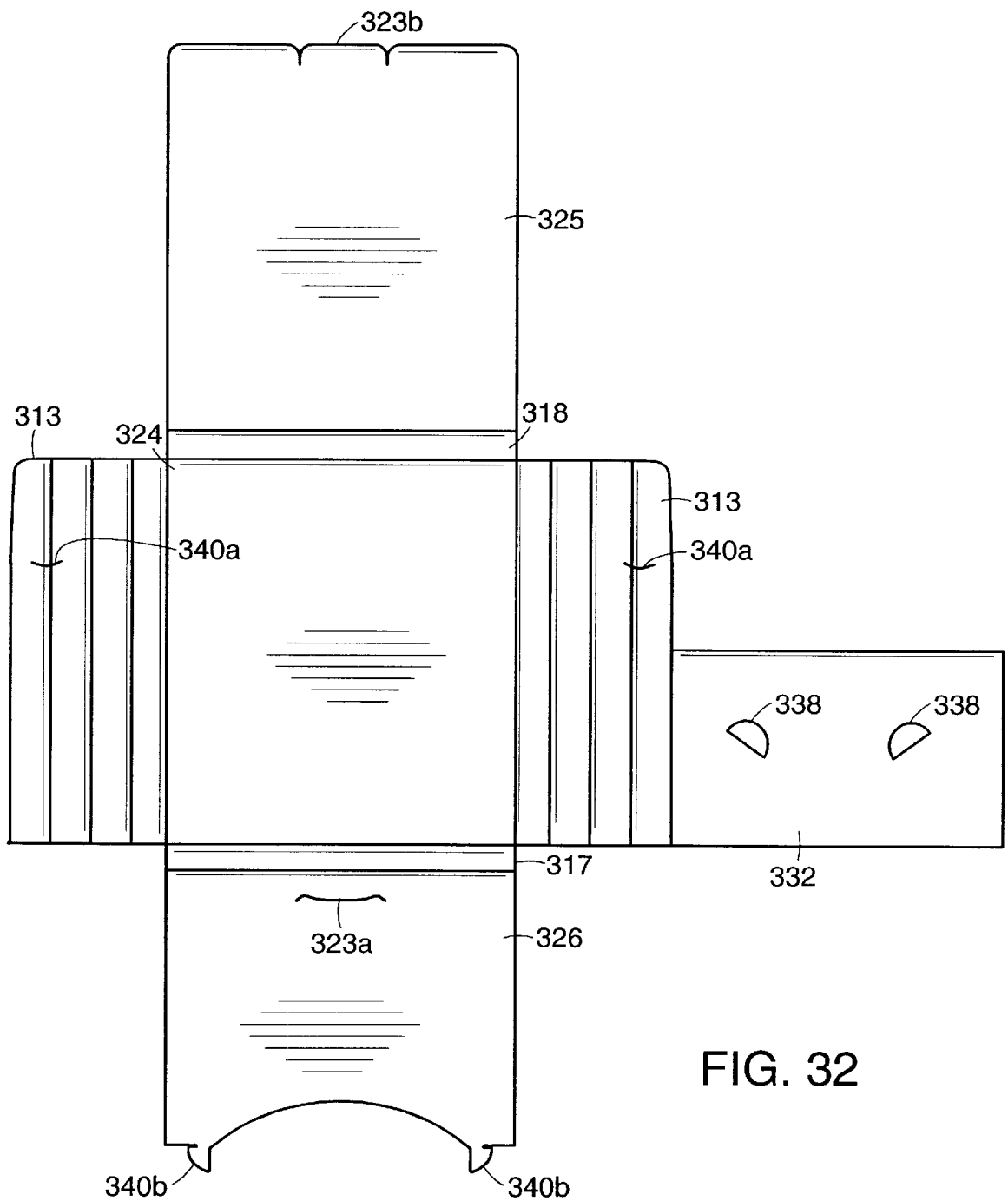
FIG. 32 is a view of a development of another cut sheet from which the case illustrated in FIG. 28 may be made.
Figure 33:
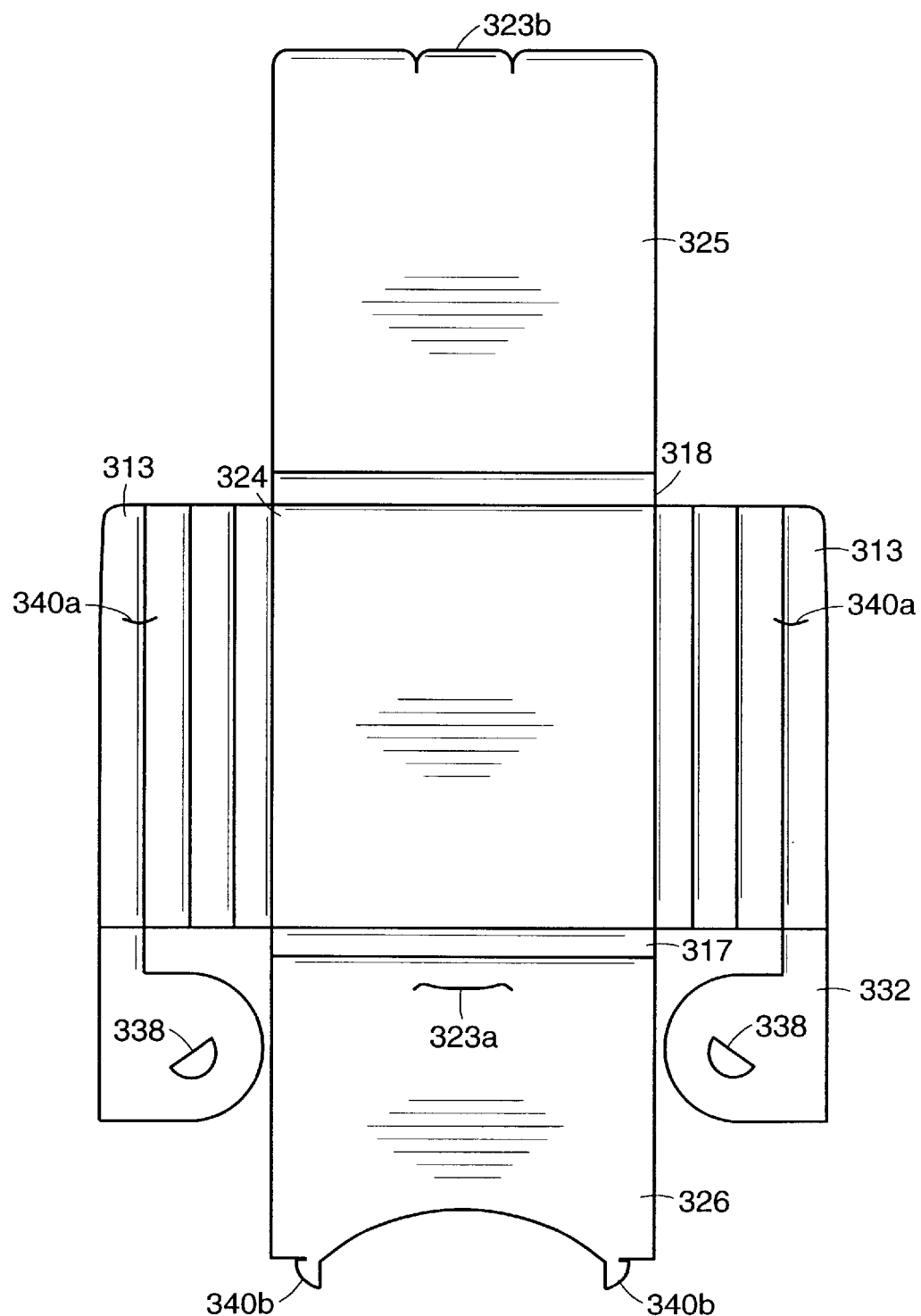
FIG. 33 is a view of a development of another cut sheet from which the case illustrated in FIG. 28 may be made.
Figure 34:
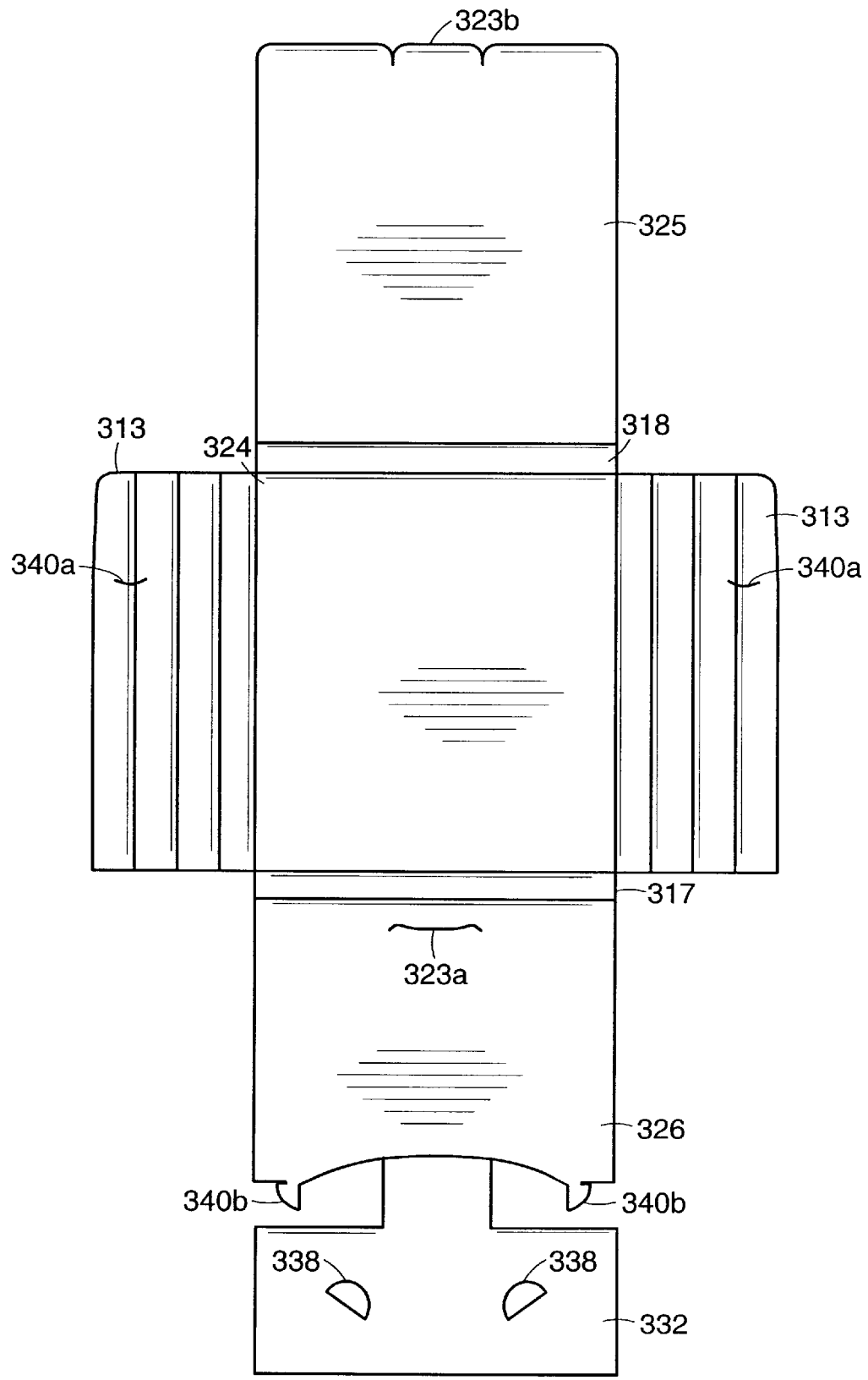
FIG. 34 is a view of a development of another cut sheet from which the case illustrated in FIG. 28 may be made.

FIGS. 31 to 34 illustrate alternative developments of cut sheets from which the case 310 may be made. In FIG. 31, extensions 332 each having stopper 338 are integrated with the opposite side margins of the bottom portion 326. In FIG. 32, one extension 332 is integrated with one of side wings 313. Stoppers 338 are formed in the extension. In FIG. 33, two extensions 332 are integrated into the bottom of the side wings 313. Stoppers 338 are formed in each extension. In FIG. 34, one extension 332 is integrated into the bottom of the bottom portion 326. Stoppers 338 are formed in this extension.

Equivalents

While the invention has been particularly shown and described with reference to specific preferred embodiments, it should be understood by those skilled in the art that various changes in form and detail may be made therein without departing from the spirit and scope of the invention as defined by the appended claims.

what is claimed is:

1. A case for receiving disk-type recording medium, comprising:

a single folded sheet of material defining a receiving chamber, the sheet comprising a planar four sided disk receiving surface having wings extending from at least three sides thereof, wherein, first and second wings located on opposite sides of the disk receiving surface are folded along a plurality of creases to form a bellows for supporting the disk-type recording medium in valleys of the bellows, the first or second wing is folded along a crease to form a lid facing the disk receiving surface, the lid being co-extensive with the receiving chamber, and a third wing is turned up thereby forming a bottom surface to the receiving chamber, and a disk-type recording medium disposed in the receiving chamber.

2. The case of claim 1 wherein the third wing further comprises a stopper formed by folding inward a portion of the wing so that when the recording medium is inserted into the case it is abutted at an edge by the stopper such that it is held firmly in place.

3. The case of claim 2 wherein the stopper is rectangular.

4. The case of claim 2 wherein the stopper is semi-circular.

5. The case of claim 2 wherein the stopper is formed near the bottom surface.

6. The case of claim 1 further comprising a stopper affixed to the bottom surface of the disk receiving chamber so that when the recording medium is inserted into the case it is abutted at an edge by the stopper such that it is held firmly in place.

7. The case of claim 6 further comprising a stopper affixed to a central portion of the disk receiving surface.

8. The case of claim 2 wherein the stopper is formed in a central portion of the disk receiving surface.

9. A case for receiving disk-type recording medium, comprising:

a single folded sheet of material defining a receiving chamber, the sheet comprising a planar four sided disk receiving surface having wings extending from at least two sides thereof, wherein, a first wing extending from a side of the receiving chamber and folded along a plurality of creases to form a bellows for supporting the disk-type recording medium in valleys of the bellows, the first wing being folded along a crease to form an inner lid facing the disk receiving surface, the inner lid being co-extensive with the receiving chamber, and a second wing extending from another side of the receiving chamber and turned up thereby forming an outer lid for the disk receiving chamber; and a disk-type recording medium disposed in the receiving chamber.

10. The case of claim 9 further comprising a third wing extending from a side of the receiving chamber and folded along a plurality of creases to form a bellows for supporting the disk-type recording medium in valleys of the bellows.

* * * * *